(12) United States Patent
Thompson et al.

(10) Patent No.: US 10,599,236 B2
(45) Date of Patent: Mar. 24, 2020

(54) TRACKPADS AND METHODS FOR CONTROLLING A TRACKPAD

(71) Applicant: RAZER (ASIA-PACIFIC) PTE. LTD., Singapore (SG)

(72) Inventors: Russell David Thompson, Georgetown, TX (US); Jesse Michael Recinos, Austin, TX (US); Michael Rodney Dilley, Sunnyvale, CA (US)

(73) Assignee: RAZER (ASIA-PACIFIC) PTE. LTD., Singapore (SG)

( * ) Notice: Subject to any disclaimer, the term of this patent is extended or adjusted under 35 U.S.C. 154(b) by 0 days.

(21) Appl. No.: 15/762,036

(22) PCT Filed: Sep. 23, 2015

(86) PCT No.: PCT/SG2015/050336
§ 371 (c)(1),
(2) Date: Mar. 21, 2018

(87) PCT Pub. No.: WO2017/052465
PCT Pub. Date: Mar. 30, 2017

(65) Prior Publication Data
US 2018/0275783 A1    Sep. 27, 2018

(51) Int. Cl.
G06F 3/0354    (2013.01)
G06F 3/0488    (2013.01)
G06F 3/041    (2006.01)

(52) U.S. Cl.
CPC .......... *G06F 3/03547* (2013.01); *G06F 3/041* (2013.01); *G06F 3/0488* (2013.01); *G06F 2203/04808* (2013.01)

(58) Field of Classification Search
CPC .... G06F 3/03547; G06F 3/041; G06F 3/0488; G06F 2203/04808
(Continued)

(56) References Cited

U.S. PATENT DOCUMENTS 5,327,161 A    7/1994  Logan et al.
5,666,113 A    9/1997  Logan
(Continued)

FOREIGN PATENT DOCUMENTS

CA    2718303    4/2012
CN    1306377    3/2007
(Continued)

OTHER PUBLICATIONS

Au, Oscar & Tai, Chiew-Lan, (Nov. 2010), Multitouch finger registration and its applications; 41-48. doi:10.1145/1952222.1952233; downloaded Jun. 10, 2019 from https://www.researchgate.net (Year: 2010).*
(Continued)

*Primary Examiner* — Mark Edwards
(74) *Attorney, Agent, or Firm* — Polsinelli PC

(57) ABSTRACT

According to various embodiments, a trackpad may be provided. The trackpad may include: a sensor configured to sense a position of a plurality of fingers; and a mode determination circuit configured to select in which mode of a plurality of modes to operate the trackpad based on an output of the sensor. The plurality of modes may include at least two of the following modes: a cursor mode; a steering mode; and a virtual mouse mode.

18 Claims, 14 Drawing Sheets

(58) Field of Classification Search
USPC .......................................................... 345/173
See application file for complete search history.

(56) References Cited

U.S. PATENT DOCUMENTS

| | | | |
|---|---|---|---|
| 5,880,717 A | 3/1999 | Chan et al. | |
| 6,424,338 B1 | 7/2002 | Anderson | |
| 7,499,032 B1 | 3/2009 | Mikan | |
| 7,760,189 B2 | 7/2010 | Cheston et al. | |
| 8,810,519 B2 | 8/2014 | Valentine et al. | |
| 2001/0033268 A1 | 10/2001 | Jiang | |
| 2004/0041791 A1 | 3/2004 | Dunker | |
| 2007/0061126 A1 | 3/2007 | Russo et al. | |
| 2007/0257891 A1 | 11/2007 | Esenther et al. | |
| 2008/0106523 A1* | 5/2008 | Conrad | G06F 3/033 345/173 |
| 2010/0148995 A1* | 6/2010 | Elias | G06F 3/0202 341/22 |
| 2010/0302144 A1* | 12/2010 | Burtner | G06F 3/0416 345/157 |
| 2011/0018806 A1* | 1/2011 | Yano | G06F 3/0488 345/163 |
| 2011/0087963 A1 | 4/2011 | Brisebois et al. | |
| 2012/0139857 A1 | 6/2012 | Terebkov et al. | |
| 2013/0222274 A1 | 8/2013 | Mori et al. | |
| 2014/0085254 A1 | 3/2014 | Tenuta et al. | |
| 2014/0320421 A1* | 10/2014 | Wei | G06F 3/0488 345/173 |
| 2014/0354587 A1 | 12/2014 | Mohindra et al. | |
| 2015/0077352 A1* | 3/2015 | Ma | G06F 3/03547 345/173 |
| 2015/0143273 A1* | 5/2015 | Bernstein | G06F 3/0488 715/767 |
| 2015/0212698 A1* | 7/2015 | East | G06F 3/04842 715/856 |

FOREIGN PATENT DOCUMENTS

| | | |
|---|---|---|
| CN | 202956731 | 5/2013 |
| CN | 203540033 | 4/2014 |
| DE | 102008022778 | 11/2009 |
| EP | 2328066 A1 | 6/2011 |
| WO | WO 02-48642 | 6/2002 |

OTHER PUBLICATIONS

Extended European Search Report dated Jul. 31, 2018, 8 pages, for the corresponding European Patent Application No. 15904832.1.
International Search Report and Written Opinion, dated Jul. 4, 2016, for the corresponding International Application No. PCT/SG2015/050336 in 10 pages.
European Examination Report dated Jul. 19, 2019, 9 pages, for the corresponding European Patent Application No. 15904832.1.

* cited by examiner

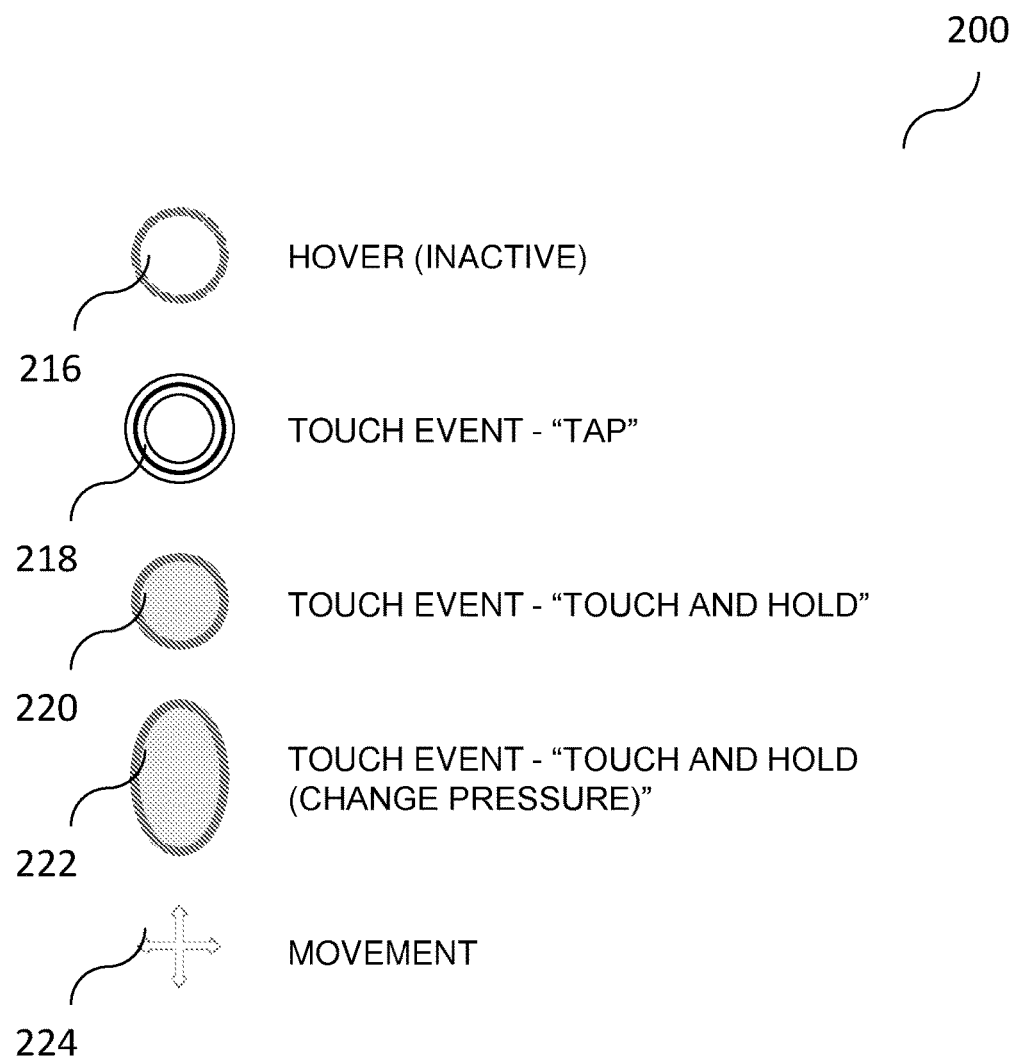

TRACKPADS AND METHODS FOR CONTROLLING A TRACKPAD

TECHNICAL FIELD

Various embodiments generally relate to trackpads and methods for controlling a trackpad.

BACKGROUND

HIDs (human interface devices) like mice and keyboards are the de-facto standard for input in computer systems today. There are however many new devices that generate HID data that are being taken advantage of in different ways to satisfy usage models that span across a wide spectrum. Track pads have emerged as a type of device that is getting a lot of development effort applied to them, most often to allow gestures developed for touch screens. Even with this growth in usage and features, there are some areas that are lacking and could be take advantage of. Thus, there may be a need for addressing the current limitations.

SUMMARY OF THE INVENTION

According to various embodiments, a trackpad may be provided. The trackpad may include: a sensor configured to sense a position of a plurality of fingers; and a mode determination circuit configured to select in which mode of a plurality of modes to operate the trackpad based on an output of the sensor. The plurality of modes may include at least two of the following modes: a cursor mode; a steering mode; and a virtual mouse mode.

According to various embodiments, a trackpad may be provided. The trackpad may include: a sensor configured to sense a position of a plurality of fingers; a pressure determination circuit configured to determine a pressure of a finger of a user on the trackpad; and an action determination circuit configured to determine whether a user performs a change of pressure of a finger on the trackpad after moving the finger on the trackpad without lifting the finger from the trackpad.

According to various embodiments, a method for controlling a trackpad may be provided. The method may include: sensing a position of a plurality of fingers; selecting in which mode of a plurality of modes to operate the trackpad based on the sensing. The plurality of modes may include at least two of the following modes: a cursor mode; a steering mode; and a virtual mouse mode.

According to various embodiments, a method for controlling a trackpad may be provided. The method may include: sensing a position of a plurality of fingers; determining a pressure of a finger of a user on the trackpad; and determining whether a user performs a change of pressure of a finger on the trackpad after moving the finger on the trackpad without lifting the finger from the trackpad.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. The dimensions of the various features or elements may be arbitrarily expanded or reduced for clarity. In the following description, various embodiments of the invention are described with reference to the following drawings, in which:

FIG. 2 shows an illustration of various possible ways a finger may be involved in a virtual mouse function according to various embodiments;

DETAILED DESCRIPTION

Figure 1A:
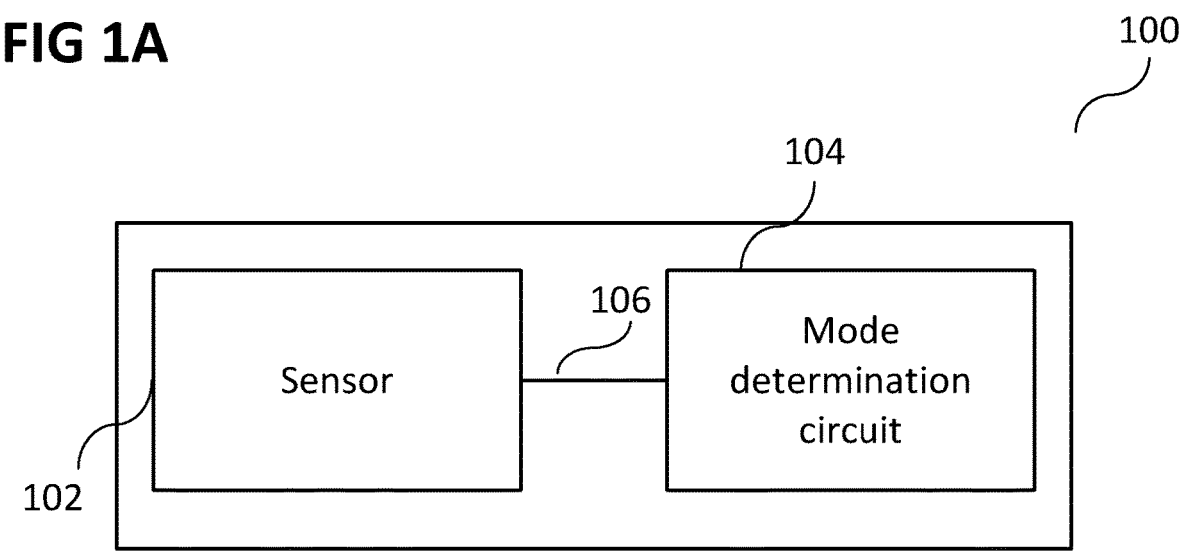
FIG. 1A shows a trackpad according to various embodiments.

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, and logical changes may be made without departing from the scope of the invention. The various embodiments are not necessarily mutually exclusive, as some embodiments can be combined with one or more other embodiments to form new embodiments.

In this context, the trackpad as described in this description may include a memory which is for example used in the processing carried out in the trackpad. A memory used in the embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

It will be understood that the expression "trackpad" may refer to a dedicated input device, or to a trackpad included in a touchscreen.

In an embodiment, a "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit" in accordance with an alternative embodiment.

In the specification the tem "comprising" shall be understood to have a broad meaning similar to the term "including" and will be understood to imply the inclusion of a stated integer or step or group of integers or steps but not the exclusion of any other integer or step or group of integers or steps. This definition also applies to variations on the term "comprising" such as "comprise" and "comprises".

The reference to any prior art in this specification is not, and should not be taken as an acknowledgement or any form of suggestion that the referenced prior art forms part of the common general knowledge in Australia (or any other country).

In order that the invention may be readily understood and put into practical effect, particular embodiments will now be described by way of examples and not limitations, and with reference to the figures.

Various embodiments are provided for devices, and various embodiments are provided for methods. It will be understood that basic properties of the devices also hold for the methods and vice versa. Therefore, for sake of brevity, duplicate description of such properties may be omitted.

It will be understood that any property described herein for a specific device may also hold for any device described herein. It will be understood that any property described herein for a specific method may also hold for any method described herein. Furthermore, it will be understood that for any device or method described herein, not necessarily all the components or steps described must be enclosed in the device or method, but only some (but not all) components or steps may be enclosed.

The term "coupled" (or "connected") herein may be understood as electrically coupled or as mechanically coupled, for example attached or fixed or attached, or just in contact without any fixation, and it will be understood that both direct coupling or indirect coupling (in other words: coupling without direct contact) may be provided.

HIDs (human interface devices) like mice and keyboards are the de-facto standard for input in computer systems today. There are however many new devices that generate HID data that are being taken advantage of in different ways to satisfy usage models that span across a wide spectrum. Track pads have emerged as a type of device that is getting a lot of development effort applied to them, most often to allow gestures developed for touch screens. Even with this growth in usage and features, there are some areas that are lacking and could be take advantage of.

According to various embodiments, devices and methods may be provided related to a track pad to address the current limitations.

Trackpads are included in various notebook computers on the market today. They do a good job of meeting the functional needs of a user engaged in basic browsing or productivity needs, but fall short of the necessary features needed for high end gaming or CAD (computer-aided design) or content creation. Certain applications not only can take advantage of flexible and configurable input devices but some practically require them to access the full functionality of the program. This capability is often beyond what trackpads have been able to offer with their current feature set. Currently there are no solutions in the market that offer this flexibility and configurable approach and in particular no gaming systems utilize such an input device.

According to various embodiments, a method and an apparatus for configurable (in other words: customizable) trackpad including virtual gaming control and 3D (three-dimensional) object manipulation mouse functionality may be provided.

Various embodiments are related to a configurable track pad, a customizable track pad, a track pad mouse emulation, a track pad mouse, and/or a mouse track pad.

FIG. 1A shows a trackpad 100 according to various embodiments. The trackpad 100 may include a sensor 102 configured to sense a position of a plurality of fingers. The trackpad 100 may further include a mode determination circuit 104 configured to select in which mode of a plurality of modes to operate the trackpad 100 based on an output of the sensor 102. The plurality of modes may include at least two of the following modes: a cursor mode; a steering mode; and a virtual mouse mode. The sensor 102 and the mode determination circuit 104 may be coupled with each other, like indicated by line 106, for example electrically coupled, for example using a line or a cable, and/or mechanically coupled.

According to various embodiments, in the cursor mode, at least one finger may be used to select an on screen item.

According to various embodiments, the steering mode may include or may be an avatar steering mode and/or a camera steering mode.

According to various embodiments, the steering mode may be triggered by two fingers on the trackpad.

According to various embodiments, the virtual mouse mode may be triggered by a pre-determined gesture (for example a pre-determined number of fingers (for example three fingers; for example four finger; for example five fingers) on the trackpad, or for example by a gesture like drawing an 'M' on the trackpad). In other words, the virtual mouse function could be triggered by using finger gestures on the trackpad.

According to various embodiments, the virtual mouse mode may construct (in other words: provide) a virtual mouse around a hand of a user of the trackpad.

According to various embodiments, the virtual mouse may include a sensor and at least one button.

According to various embodiments, the virtual mouse may include at least one scroll wheel.

According to various embodiments, the mode determination circuit 104 may be configured to switch between the modes based on at least one of a button press, a gesture, a touch events, launching an application, and an event within an application.

According to various embodiments, the mode determination circuit 104 may be configured to switch between the modes based on at least one of a current mode and a target mode.

It will be understood that the expression "trackpad" may refer to a dedicated input device, or to a trackpad included in a touchscreen. According to various embodiments, the trackpad 100 may be provided in a touchscreen (in other words: the trackpad 100 may be the touch sensitive portion of a touchscreen).

Figure 1B:
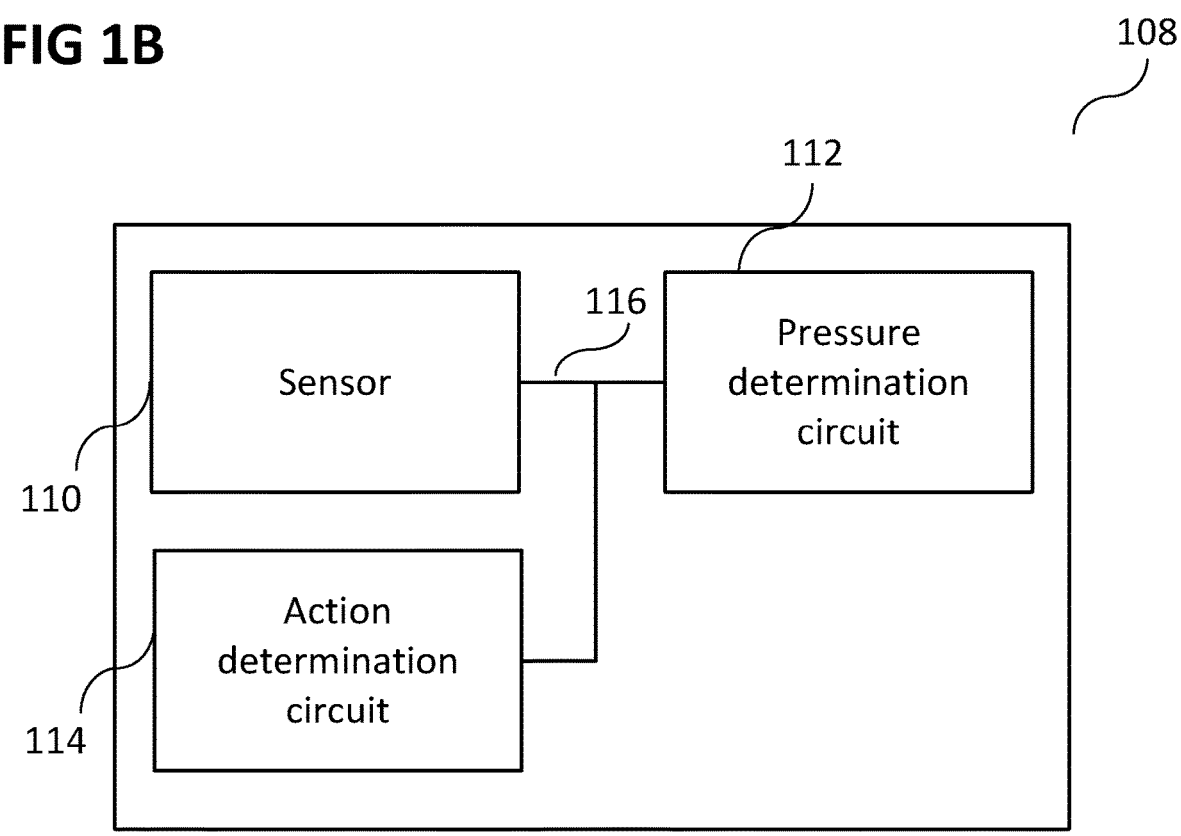
FIG. 1B shows a trackpad according to various embodiments.

FIG. 1B shows a trackpad 108 according to various embodiments. The trackpad 108 may include a sensor 110 configured to sense a position of a plurality of fingers. The trackpad 108 may further include a pressure determination circuit 112 configured to determine a pressure of a finger of a user on the trackpad 108 (for example on the sensor 110). The trackpad 108 may further include an action determination circuit 114 configured to determine whether a user performs a change of pressure of a finger on the trackpad 108 after moving the finger on the trackpad 108 without lifting the finger from the trackpad 108. The sensor 110, the pressure determination circuit 112, and the action determination circuit may be coupled with each other, like indicated by lines 116, for example electrically coupled, for example using a line or a cable, and/or mechanically coupled.

In other words, an action corresponding (or equivalent) to a click action may be performed on a trackpad 108 without lifting the finger, by changing a pressure of the finger on the trackpad 108.

According to various embodiments, the change of pressure may include or may be an increase of pressure.

According to various embodiments, the change of pressure may include or may be a decrease of pressure.

According to various embodiments, the action determination circuit 114 may be configured to determine whether an item is selected based on a user moving his finger on the trackpad 108 and then changing the pressure of the finger on the trackpad 108.

According to various embodiments, the pressure determination circuit 112 may be configured to determine the pressure based on a size of the fingertip on the sensor 110.

According to various embodiments, the trackpad 108 may be provided in a touchscreen (in other words: the trackpad 108 may be the touch sensitive portion of a touchscreen).

Figure 1C:
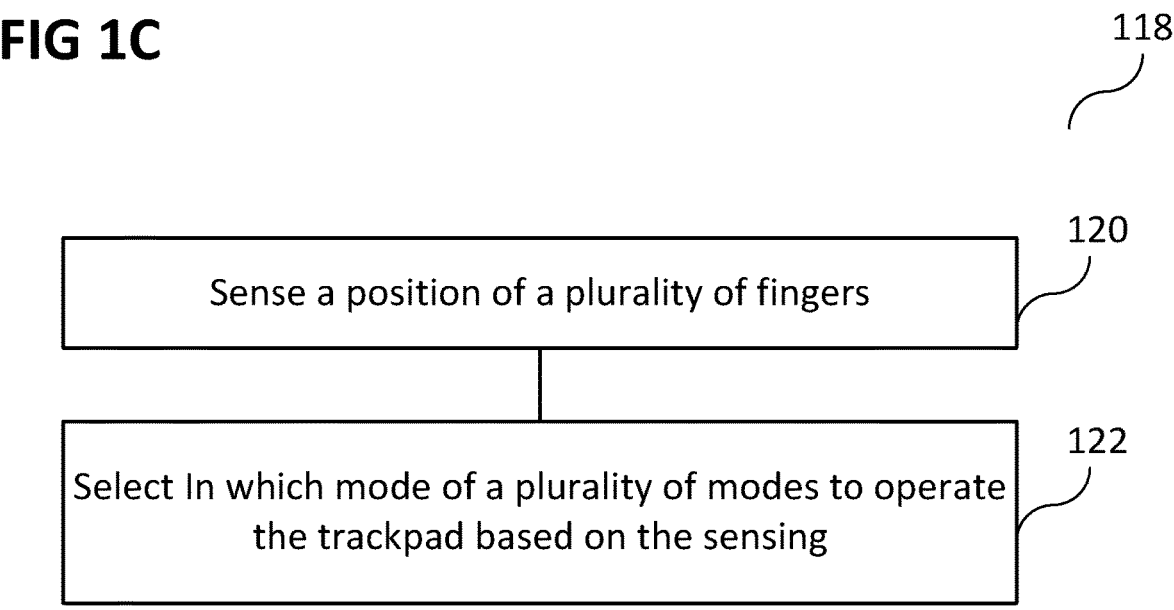
FIG. 1C shows a flow diagram illustrating a method for controlling a trackpad.

FIG. 1C shows a flow diagram 118 illustrating a method for controlling a trackpad (for example a trackpad like shown in FIG. 1A) according to various embodiments. In 120, a position of a plurality of fingers may be sensed. In 122, which mode of a plurality of modes to operate the trackpad may be selected based on the sensing. The plurality of modes may include at least two of the following modes: a cursor mode; a steering mode; and a virtual mouse mode.

According to various embodiments, in the cursor mode, at least one finger may be used to select an on screen item.

According to various embodiments, the steering mode may include or may be at least one of an avatar steering mode or a camera steering mode.

According to various embodiments, the steering mode may be triggered by two fingers on the trackpad.

According to various embodiments, the virtual mouse mode may be triggered by a pre-determined gesture (for example a pre-determined number of fingers (for example three fingers; for example four finger; for example five fingers) on the trackpad, or for example by a gesture like drawing an 'M' on the trackpad). In other words, the virtual mouse function could be triggered by using finger gestures on the trackpad.

According to various embodiments, the virtual mouse mode may provide a virtual mouse around a hand of a user of the trackpad.

According to various embodiments, the virtual mouse may include a sensor and at least one button.

According to various embodiments, the virtual mouse may include at least one scroll wheel.

According to various embodiments, the method may further include switching between the modes based on at least one of a button press, a gesture, a touch events, launching an application, and an event within an application.

According to various embodiments, the method may further include switching between the modes based on at least one of a current mode and a target mode.

Figure 1D:
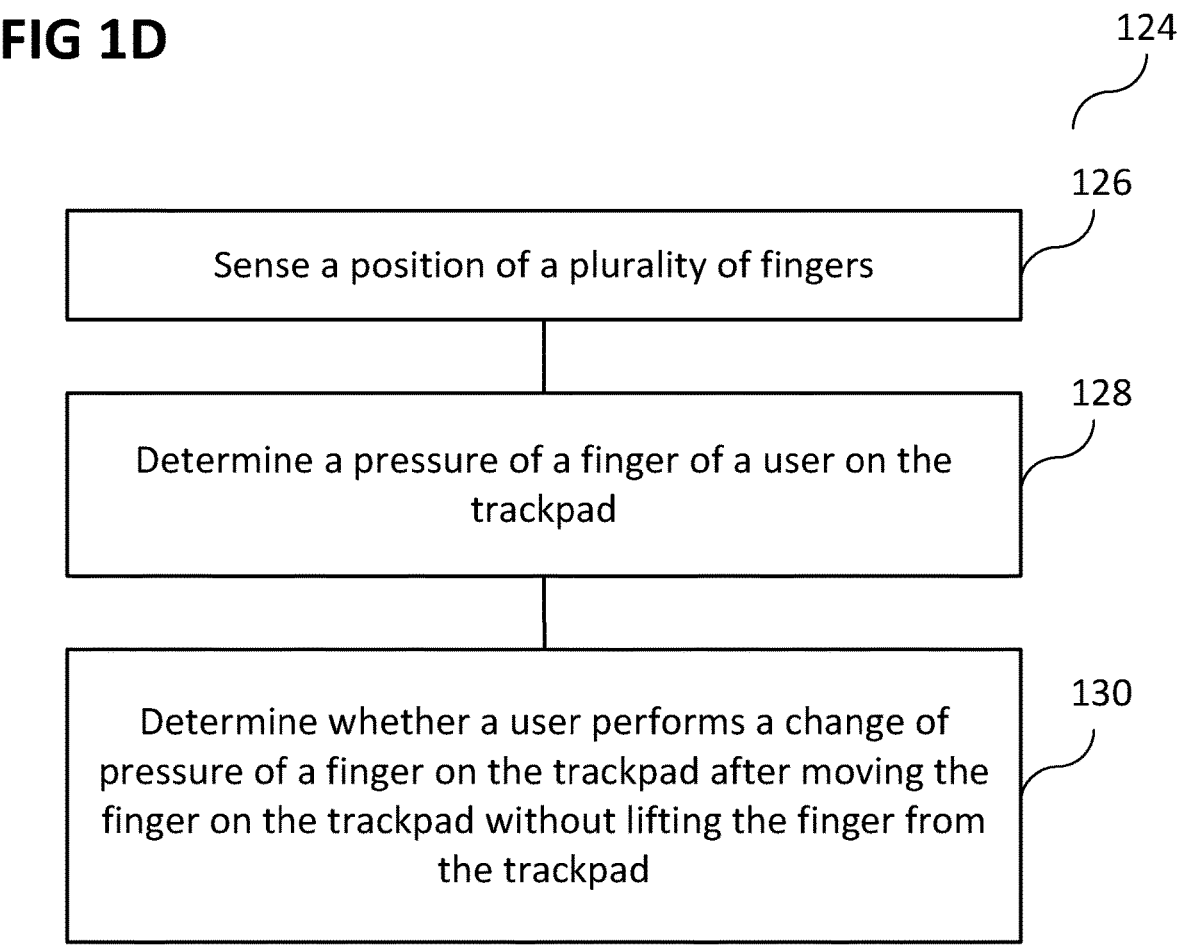
FIG. 1D shows a flow diagram illustrating a method for controlling a trackpad.

FIG. 1D shows a flow diagram 124 illustrating a method for controlling a trackpad (for example a trackpad like shown in FIG. 1A) according to various embodiments. In 126, a position of a plurality of fingers may be sensed. In 128, a pressure of a finger of a user on the trackpad may be determined. In 130, it may be determined whether a user performs a change of pressure of a finger on the trackpad after moving the finger on the trackpad without lifting the finger from the trackpad.

According to various embodiments, the change of pressure may include or may be an increase of pressure.

According to various embodiments, the change of pressure may include or may be a decrease of pressure.

According to various embodiments, the method may further include determining whether an item is selected based on a user moving his finger on the trackpad and then changing the pressure of the finger on the trackpad.

According to various embodiments, the pressure may be determined based on a size of the fingertip on the sensor.

According to various embodiments, solutions, for example devices and methods, may be provided which are flexible and configurable and which will allow the user to perform the following tasks and other user defined tasks on the track pad at the level of performance and reliability that a mouse delivers today:

Click on an item—Move pointer to an item on screen and select the item.

Click and drag an item—Move pointer to an item, click on item, move item and release.

Scroll wheel—Emulate the hardware functions of a scroll wheel using a track pad.

Figure 3A:
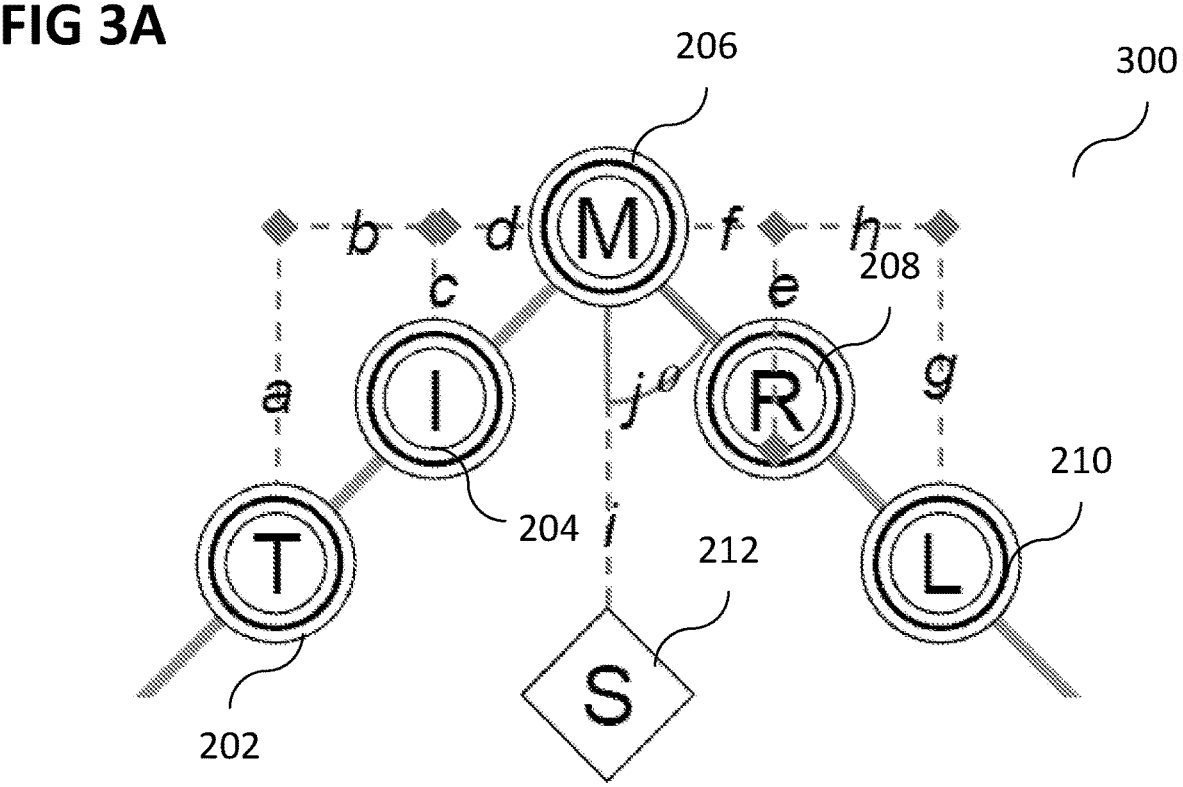
FIG. 3A and FIG. 3B show illustrations of positions of various fingers on a trackpad surface.

These actions will be performed from a state where all five fingers are in contact with the trackpad surface, for example as shown in FIG. 3A. A user may be required to disengage and re-engage contact with the trackpad surface with one or more fingers. Contact with all five fingers may not necessarily be required for all actions. For example, contact with it may be used to 1) trigger the virtual mouse mode and 2) calibrate the sensor position based on the size of the virtual mouse (determined by the parameter established by a user's fingers). As long as at least one finger remains in constant contact (thus allowing it to be known which finger it is) then the sensor position may be moved relative to that finger (for example like described in FIG. 3B).

FIG. 2 shows an illustration 200 of various possible ways a finger may be involved in a virtual mouse function according to various embodiments. For example like indicated by a dotted circle 216, a finger may hover (for example over the touchpad), so that it may be inactive. Like indicated by a triple circle 218, a finger may perform a touch event (which may also be referred to as a tap). Like indicated by a circle with a single (fat) line 220, a finger may perform a touch event, and may furthermore be rested on the touchpad (which may also be referred to as a touch and hold). A change in pressure for a touch and hold may be indicated by an ellipse 222. Movement may be indicated by arrows 224. The symbols for the involvement of the fingers may be used for various illustrations as described herein, and duplicate description may be omitted.

Figure 3B:
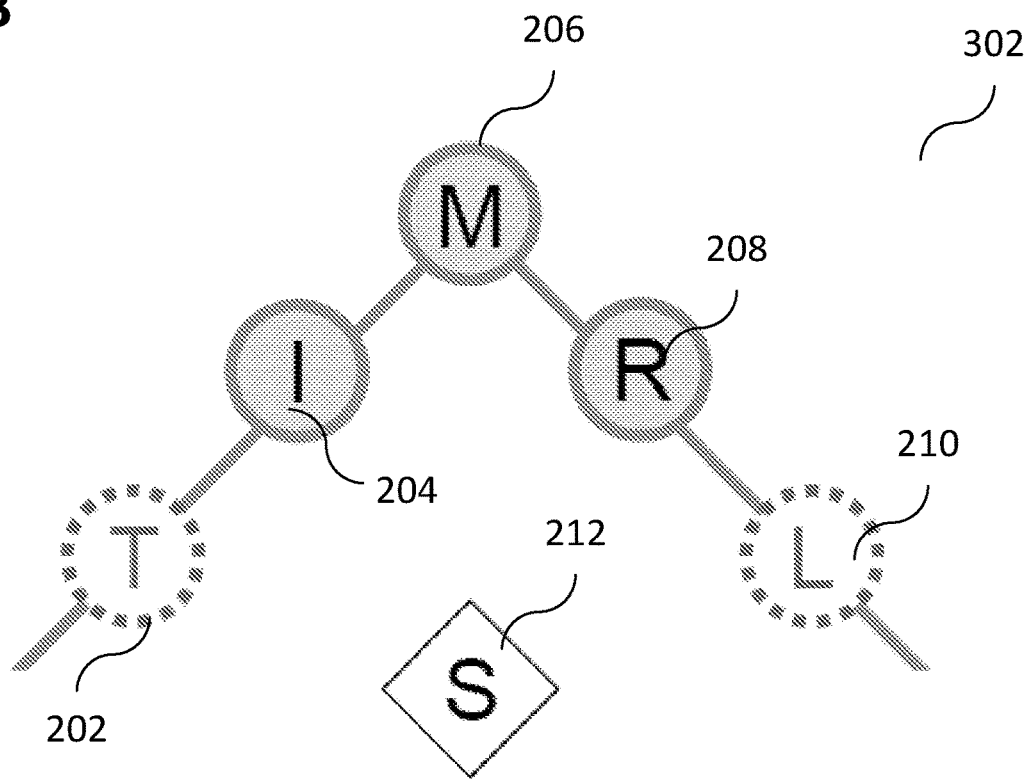

FIG. 3A and FIG. 3B show illustrations of triggering and calibrating a virtual mouse mode.

FIG. 3A shows an illustration of various positions on a trackpad surface. A position 202 of the thumb ("T"), a position 204 of the index finger ("I"), a position 206 of the middle finger ("M"), a position 208 of the ring finger ("R"), and a position of the little finger i.e. Pinkie ("L") and a virtual sensor position 212 ("S") with arrows 214 are shown.

According to various embodiments, this action may serve the following purposes:

Switching the trackpad into the virtual mouse mode; and/or

Calibrating the position of the "virtual sensor" (I, j) by establishing the parameter of the device based on the position of and distance between the users fingers (a through h).

Like the physical sensor on a mouse input device, the virtual sensor 212 may be the point that is used to calculate delta X and delta Y as the device (or in this case virtual device) is moved. These calculations may drive the on-screen cursor. The position of this virtual sensor may be determined based on the centroid of the detected location of the fingers on the sensor. According to various embodiments, implementation may include a software interface for the user to adjust the position based on preference.

FIG. 3B shows an illustration 302 of various finger positions and actions on a trackpad. Like illustrated in FIG. 3B, a sensor position 212 may (for example subsequently, for example after the situation illustrated in FIG. 3A) be maintained even with fewer points as long as at least one finger remains in constant contact (thus allowing it to be known which finger it is), and then the sensor position may be moved relative to that finger.

Various embodiments (for example devices and methods) may address the identified discrete interactive modes for the trackpad, each with its own gesture behavior, that can address the various needs a single user may have through the course of using his/her notebook. Furthermore, according to various embodiments, various devices and methods may be provided, and will be described by way of the different embodiments and identified states as noted below for how to seamlessly transition between these interactive modes, by application or by task within a single given application.

According to various embodiments, interactions between the user and the track pad and those single or multiple finger touches and movement which will result in predetermined movements of the on screen cursor for the various modes of use may be provided.

According to various embodiments, a mode to emulate (on a trackpad) all the functions, actions and on-screen positioning of a physical mouse pointer may be provided. Various embodiments may address for one of the last missing pieces to a mobile (notebook) gaming experience by providing the user with the option to play "core" PC (personal computer) games even when it is not convenient to connect an external mouse (i.e. on a plane, couch, etc.).

According to various embodiments, devices and methods may be provided for a trackpad to switch between different modes (as described in more detail below) for different applications. A user may also configure the modes (i.e. either deactivate or activate the mode for switching or configure desired functions within the mode itself).

According to various embodiments, virtual mouse buttons may match the expectation of users. For example, index finger and middle finger may act as left mouse button and right mouse button respectively.

According to various embodiments, click and drag behavior may mirror real mouse functionality.

According to various embodiments, scroll wheel behavior may mirror real mouse functionality.

According to various embodiments, all user interactive modes and specific usages may be configured through unique profiles as load into the device by way of a cloud based computer model (for example Synapse).

According to various embodiments, the positioning of the fingers on the trackpad may correlate to manipulations of the mouse. The fingers may initially be set in a triangular disposition.

According to various embodiments, there are a plurality (for example three) typical users' trackpad states and transmission modes, for example defined as follows:
1) Pointer/Cursor Mode (Default/State #1)
  a) In this mode, one finger may be used to select and interact with on screen items. In some cases, multiple fingers may be used to complete specialized tasks (special swipe motions etc.).
  b) Primary use may be general computer interaction and navigation.
2) Avatar/Camera Steering Mode (State #2)
  a) This mode may be triggered by two (or more) fingers on the trackpad (for example, up to five fingers may be used). This mode may be used for camera mode and some cursor mode actions.
  b) This mode may provide in game camera control.
3) Virtual Mouse Mode (State #3)
  a) This mode may be triggered by all five fingers in contact with the trackpad. This mode may "construct" a virtual mouse around a user's hand, including sensor, buttons, scroll wheel etc.
  b) Primary uses of this mode may be selecting, attacking, grabbing, click and drag etc.

According to various embodiments, switching between modes may be accomplished by the use of several different mechanisms such as button presses, gestures, touch events (including adding additional fingers), launching an application, events within an application, and/or any combination thereof. This may also vary based on the current and target mode.

An in game interaction example according to various embodiments may be as follows: Switching between Avatar/Camera modes and Virtual-mouse mode may use a state where all five fingers are simultaneously placed on the trackpad for a short period of time, allowing the creation of a correctly sized/proportioned virtual mouse with a virtual sensor point calculated from finger position.

According to various embodiments, a virtual gaining/3D modelling mouse may be provided.

Various embodiments relate to the virtual mouse mode and its various configurations as described in more detail below.

According to various embodiments, sensor position that would exist on a physical mouse, relative to a hand, may be emulated.

According to various embodiments, virtual mouse buttons may match the expectation of users, i.e. index and middle finger may act as left and right mouse buttons respectively.

According to various embodiments, click and drag behavior may mirror (in other words: emulate) functionality of a real mouse.

According to various embodiments, scroll wheel behavior may mirror (in other words: emulate) functionality of a real mouse.

According to various embodiments, an emulated relative sensor position may be modified by a user to replicate different historic and vendor specific mice behavior.

According to various embodiments, a mouse button behavior (mouse-up and mouse-down) may be triggered by a tap to the track pad.

According to various embodiments, a click and drag behavior which may mirror real mouse functionality may be provided.

According to various embodiments, an inversion/invert the click action behavior may be provided, like will be described in more detail in the following.

According to various embodiments, when a user wants to click (in other words: select an item), he may move the pointer to the item and lift his index finger. This action may map to a left button mouse-up command, which may translates to a left button click.

According to various embodiments, to click and drag, a user may move the point to an item, lift his index finger off of the trackpad and may move his hand on the trackpad to a new location, and may put his index finger back on the trackpad. Re-engaging his index finger may perform the release action to drop the item.

According to various embodiments, a variation of this behavior may be for the lifting of the finger to trigger a mouse down and returning the finger to the trackpad may trigger the mouse-up. This may allow long continuous presses useful for actions such as charging up an energy weapon before discharge.

According to various embodiments, a virtual button persistence/maintain normal click action behavior may be provided, like will be described in more detail in the following.

Normally, when a user wants to select an item, he moves the on-screen pointer to the item, lifts his index finger and taps the trackpad. However, if he decides to place his finger back on the trackpad without activating a mouse-click, to avoid discharging a weapon in-game for example, he must do so gently.

According to various embodiments, whenever the user disengages from the trackpad, a virtual mouse-button may be created on the trackpad, and the system may wait for the button to be pressed. The button may have a defined persistence and if no action is detected, the button may disappear. This lifespan may be configurable.

Figure 4A:
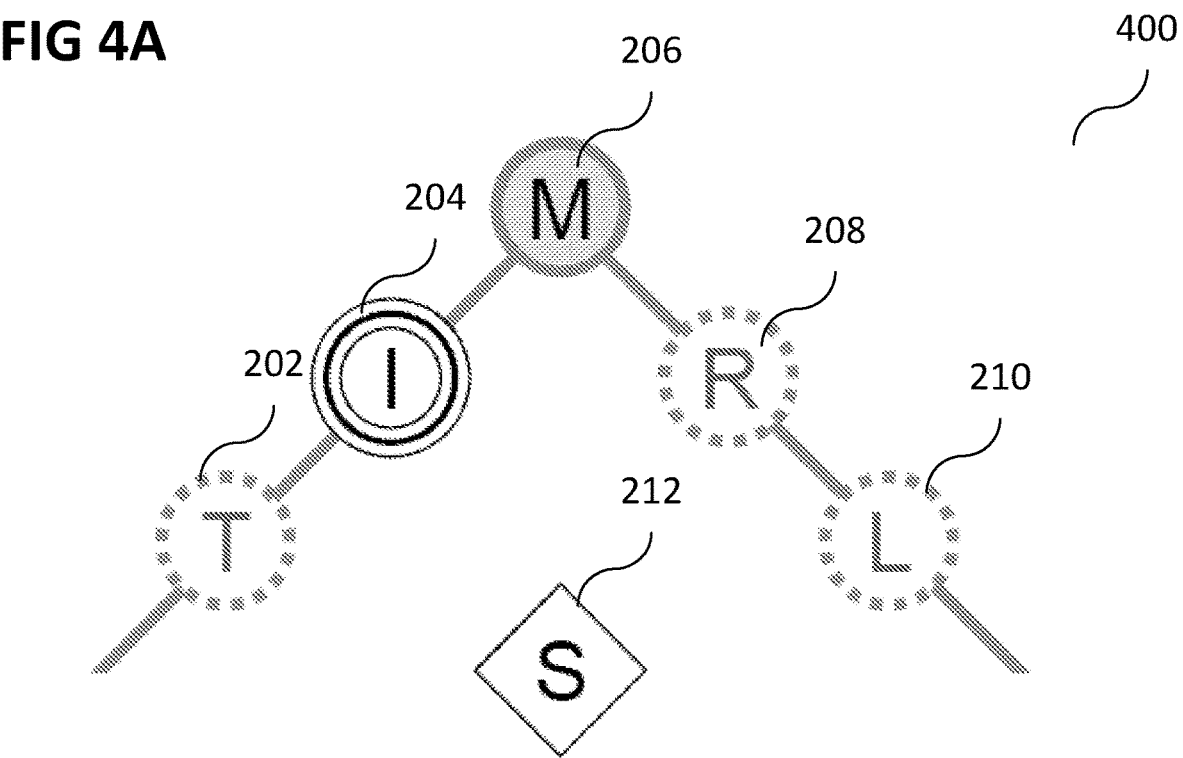
FIG. 4A to FIG. 4N show illustrations of a click and drag behavior which may mirror real mouse functionality according to various embodiments.
Figure 4B:
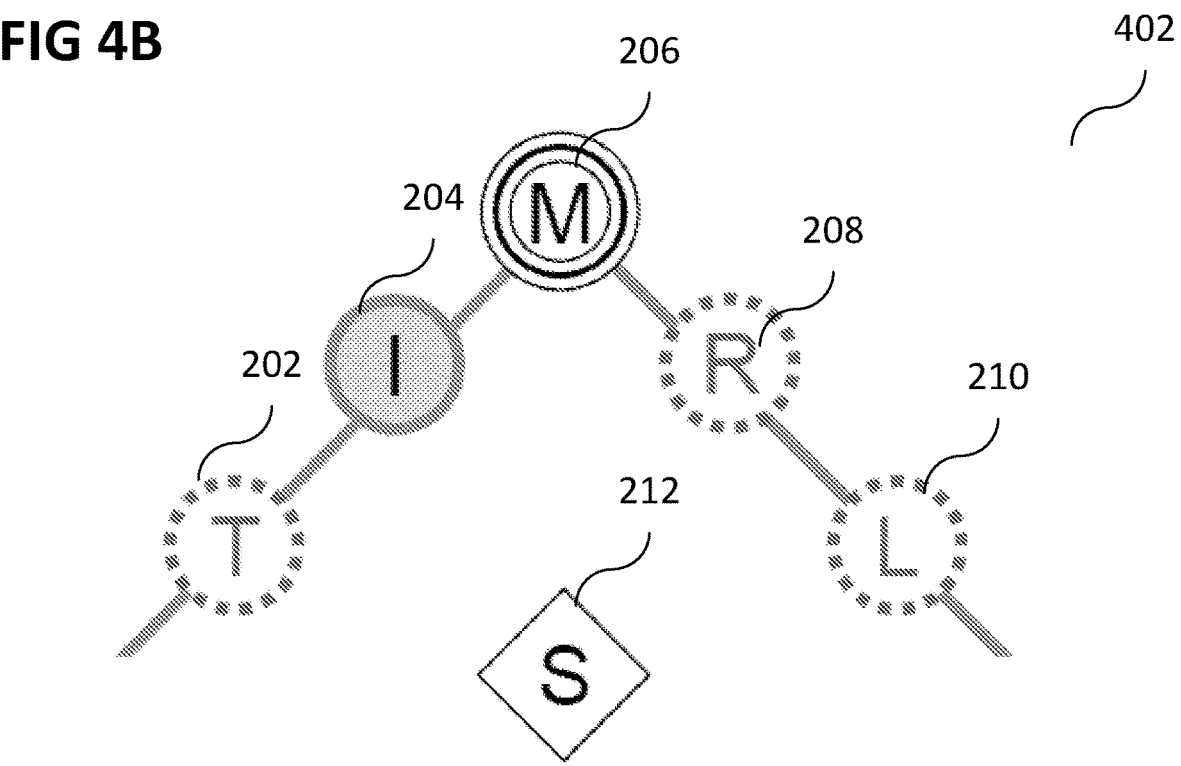
Figure 4C:
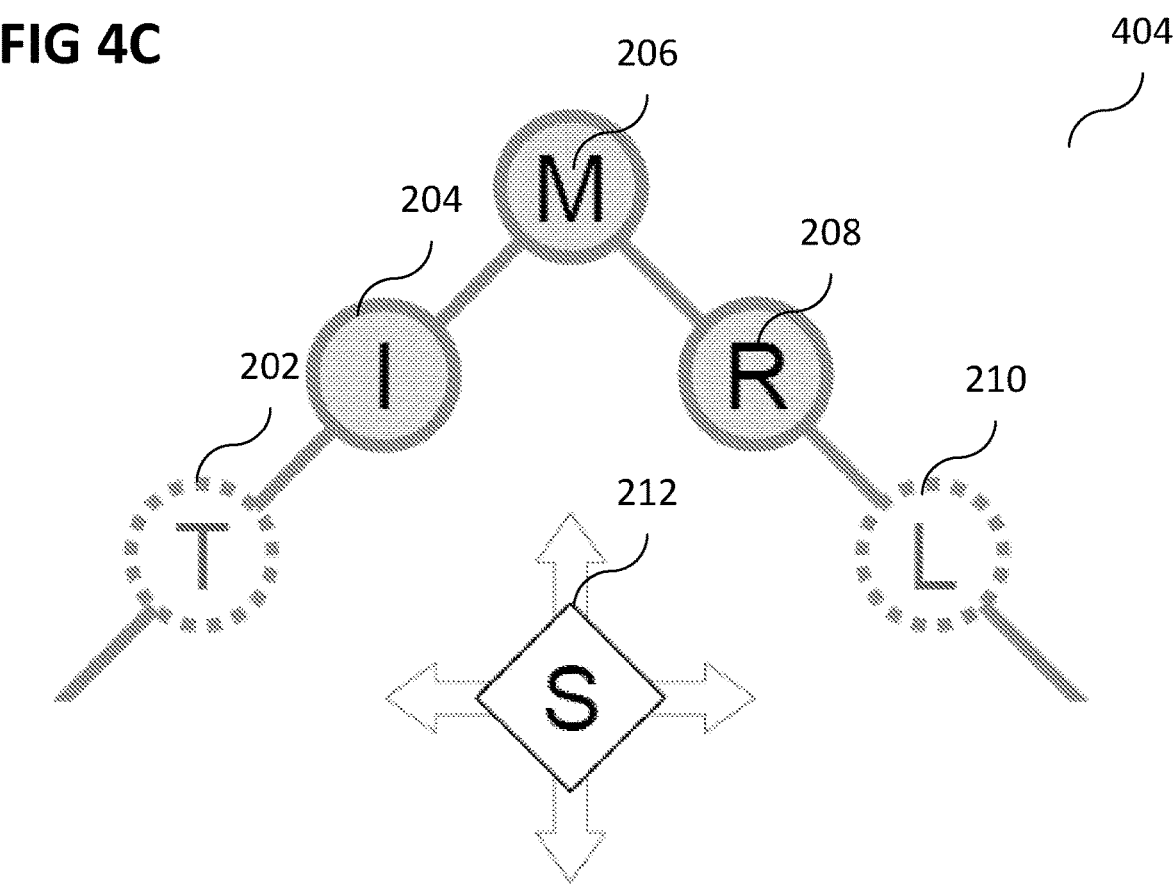
Figure 4D:
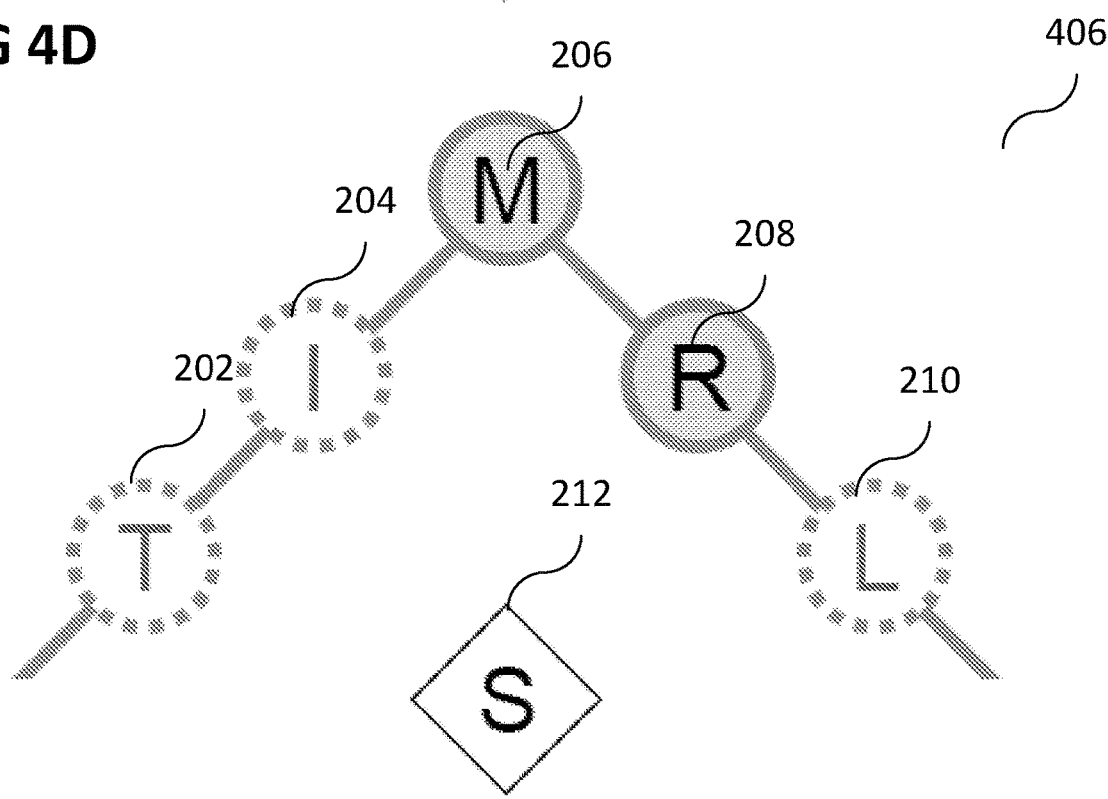
Figure 4E:
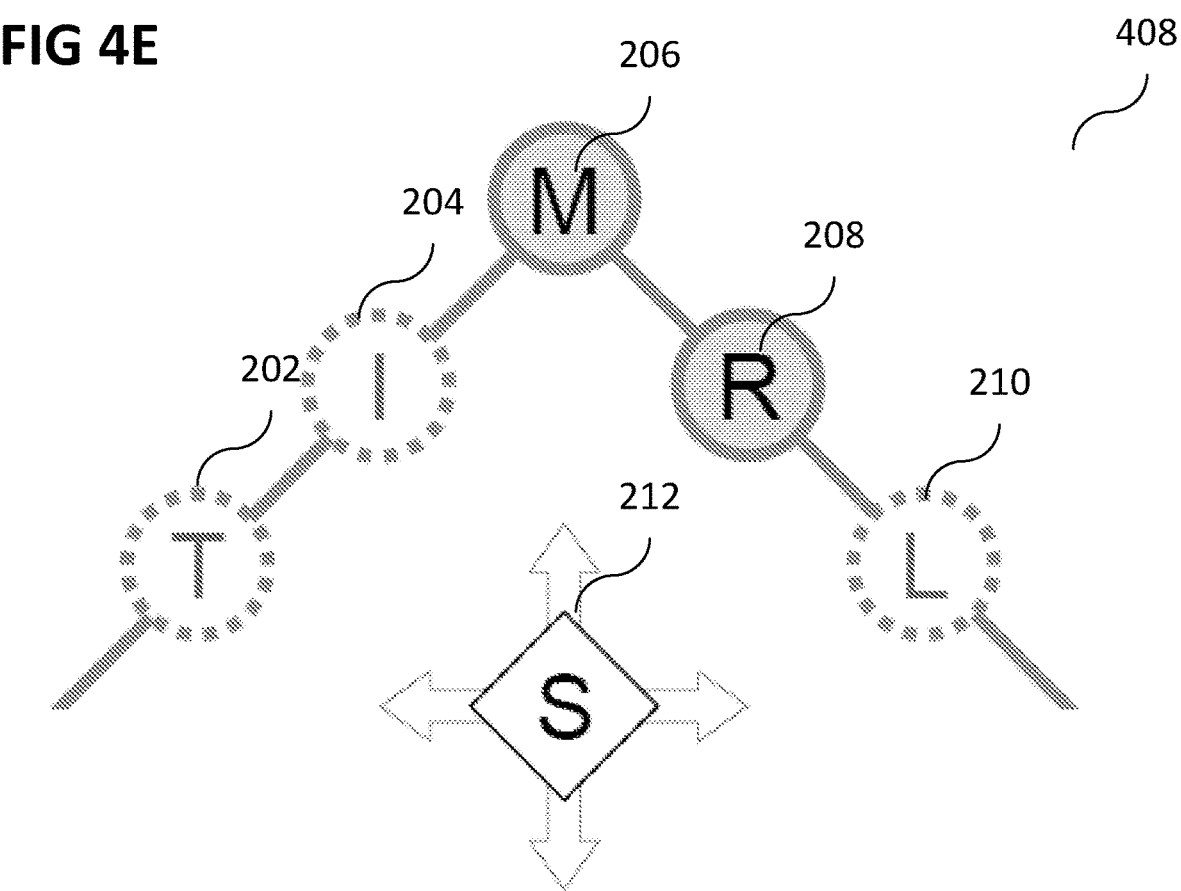
Figure 4F:
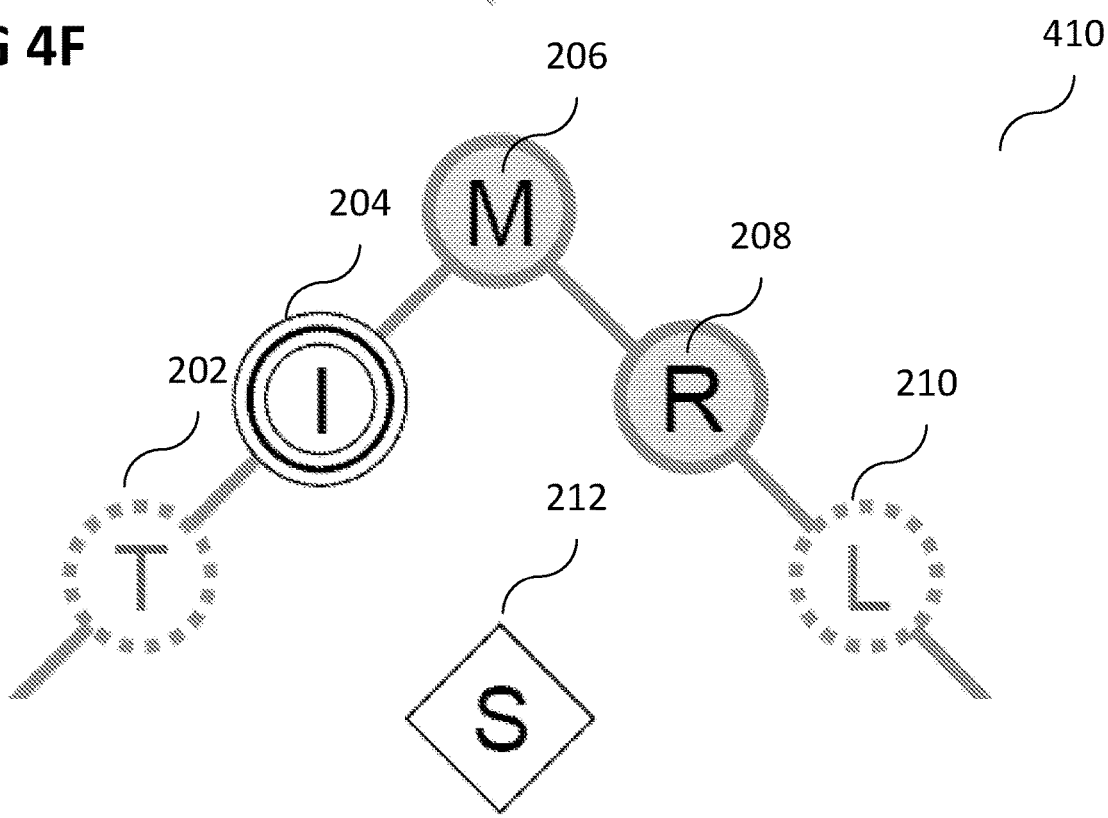
Figure 4G:
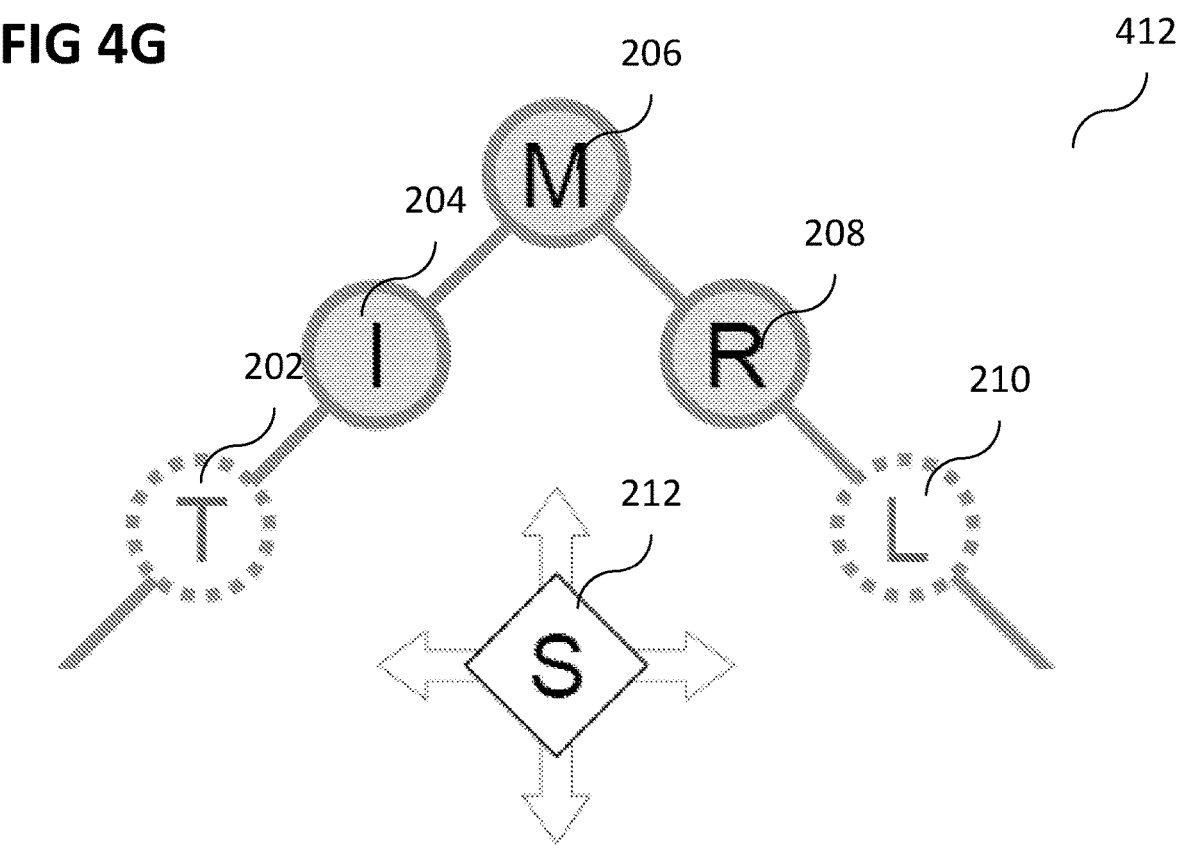
Figure 4H:
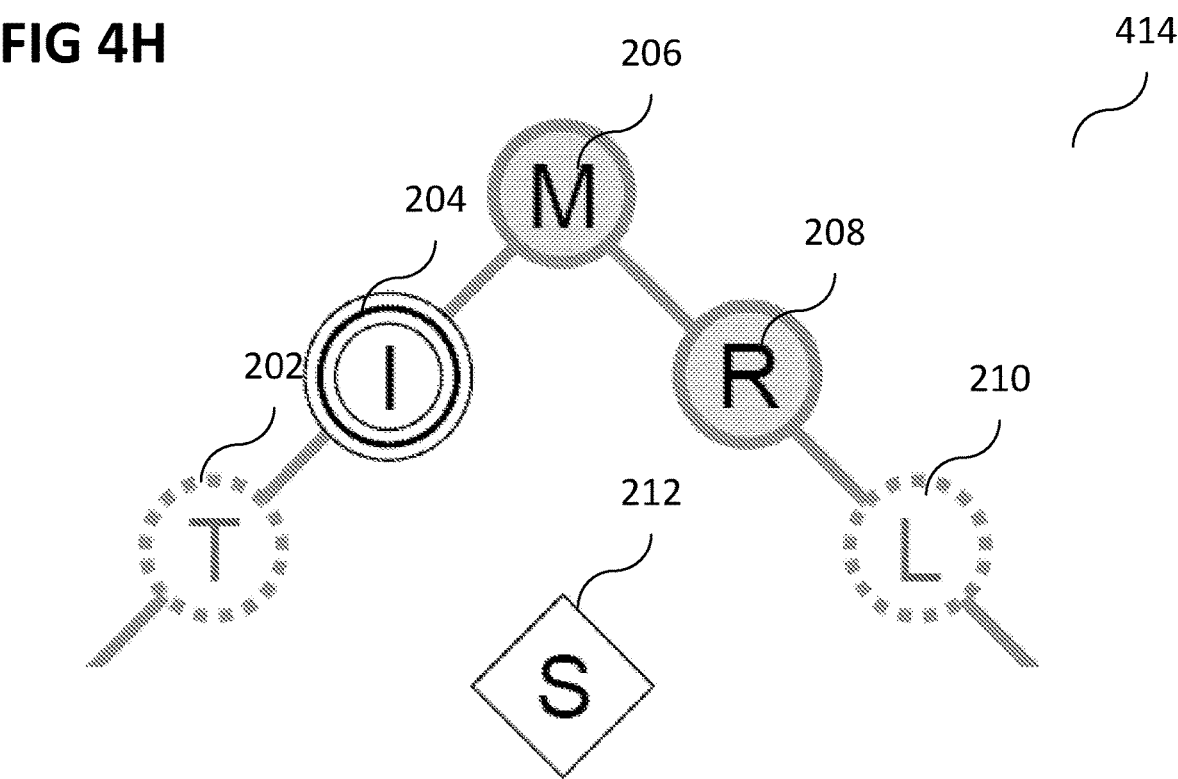
Figure 4I:
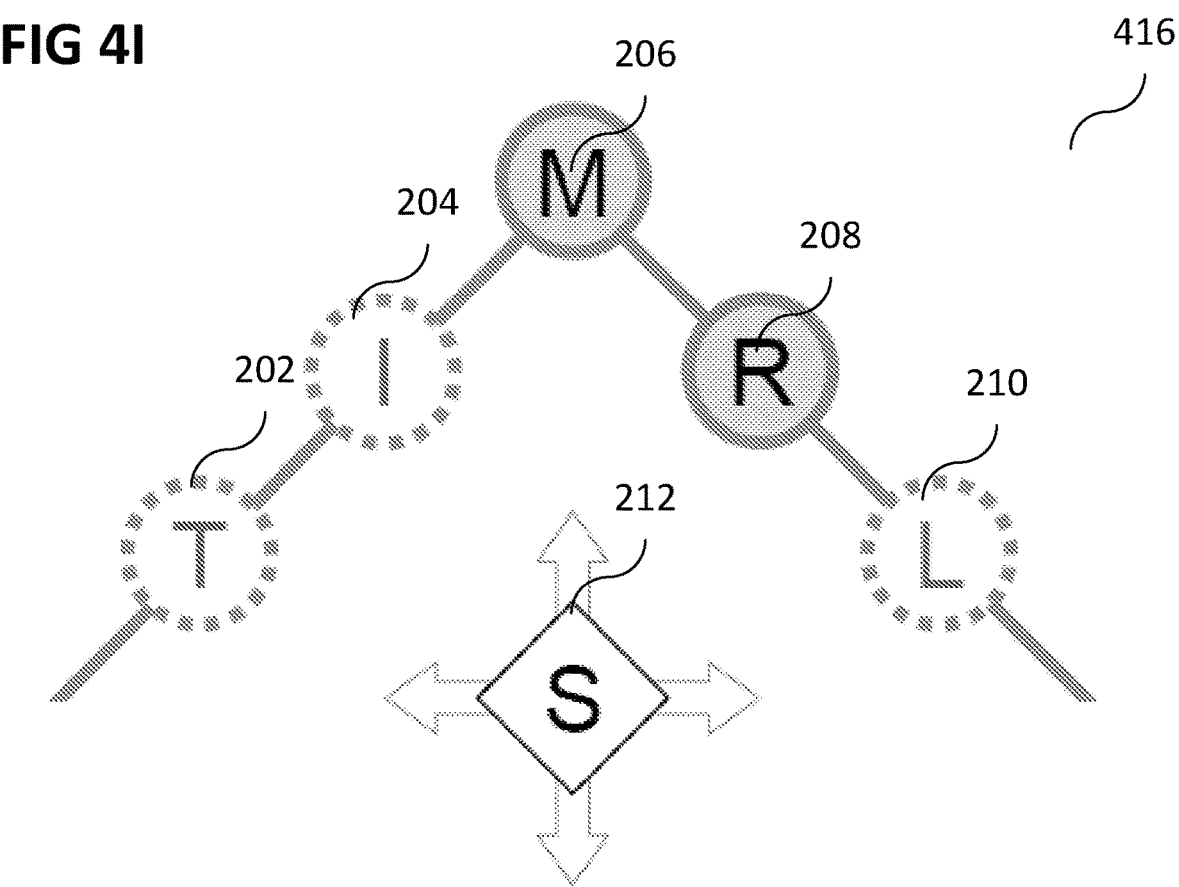
Figure 4J:
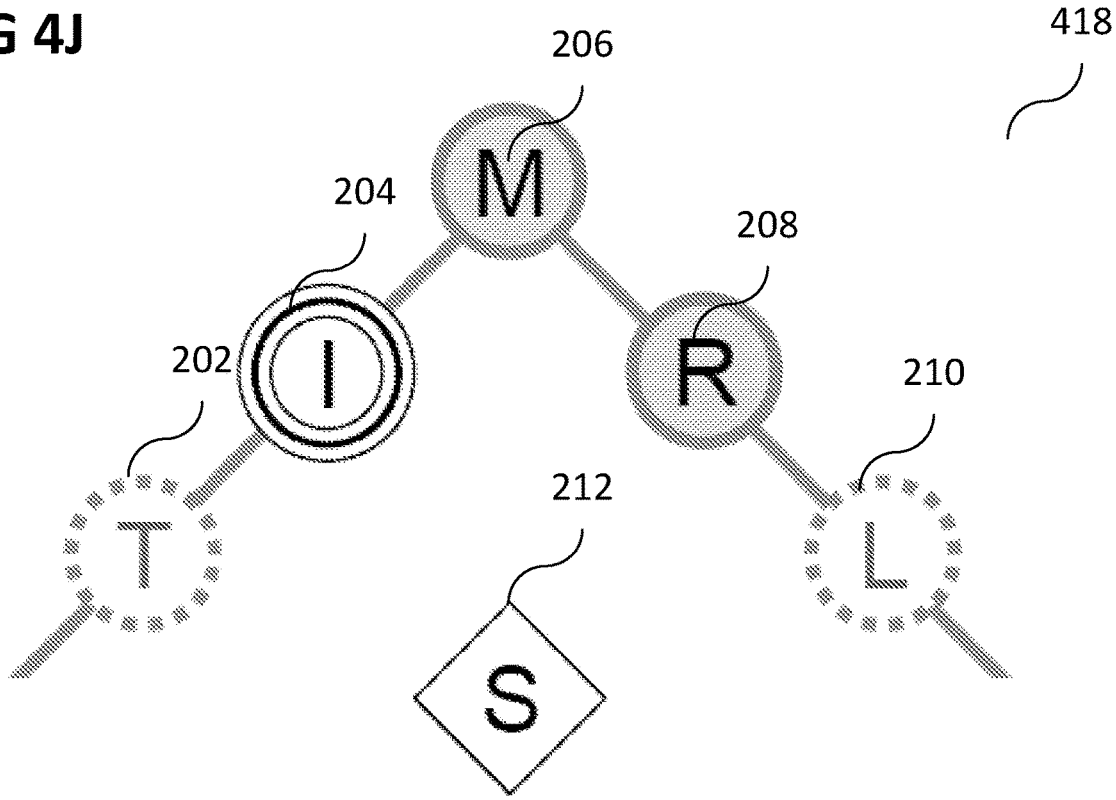
Figure 4K:
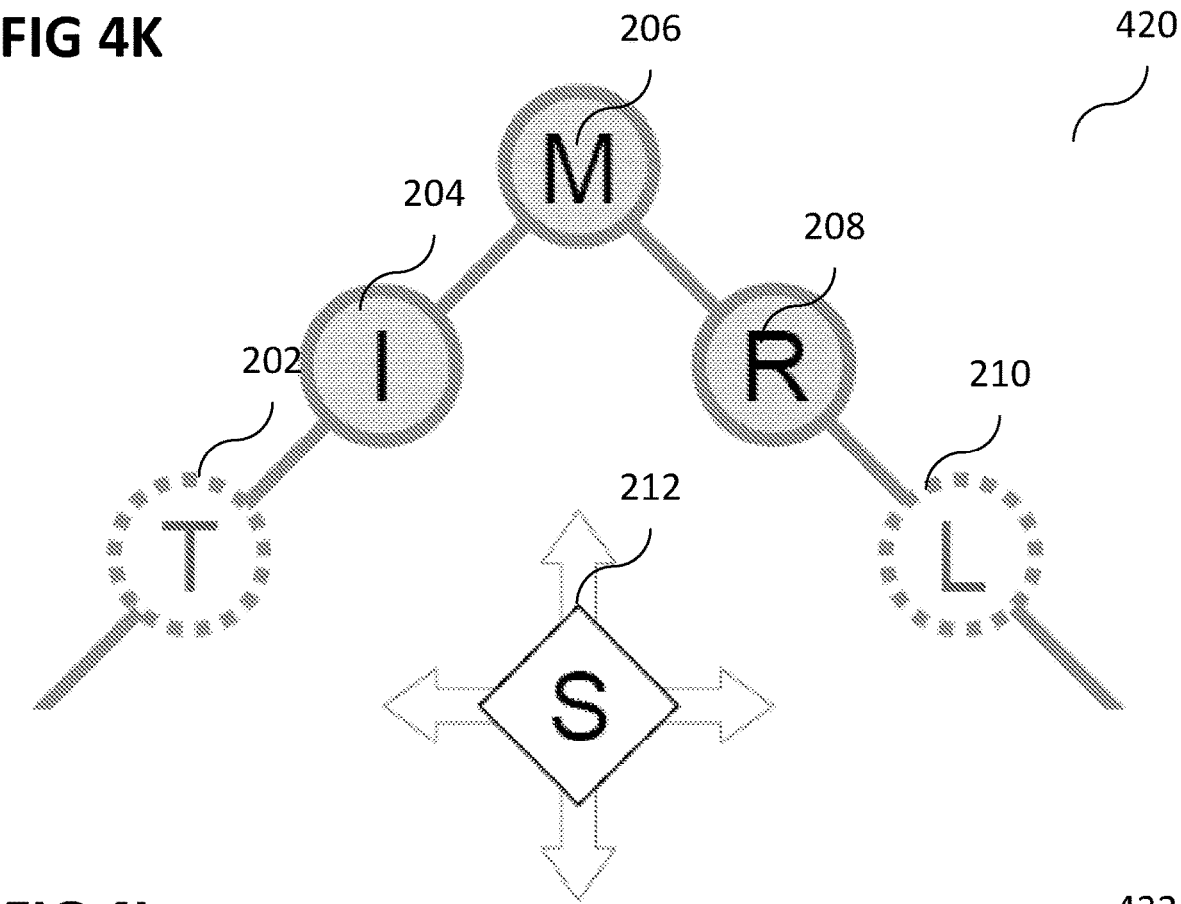
Figure 4L:
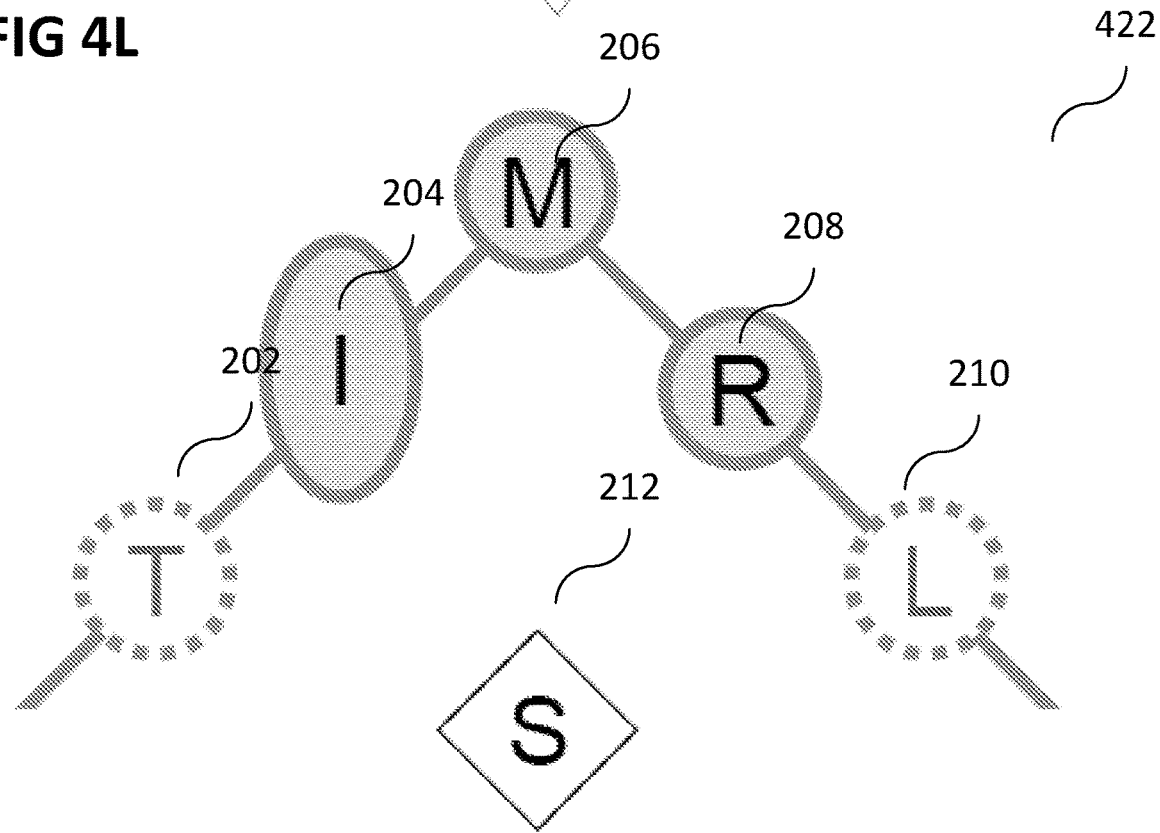
Figure 4M:
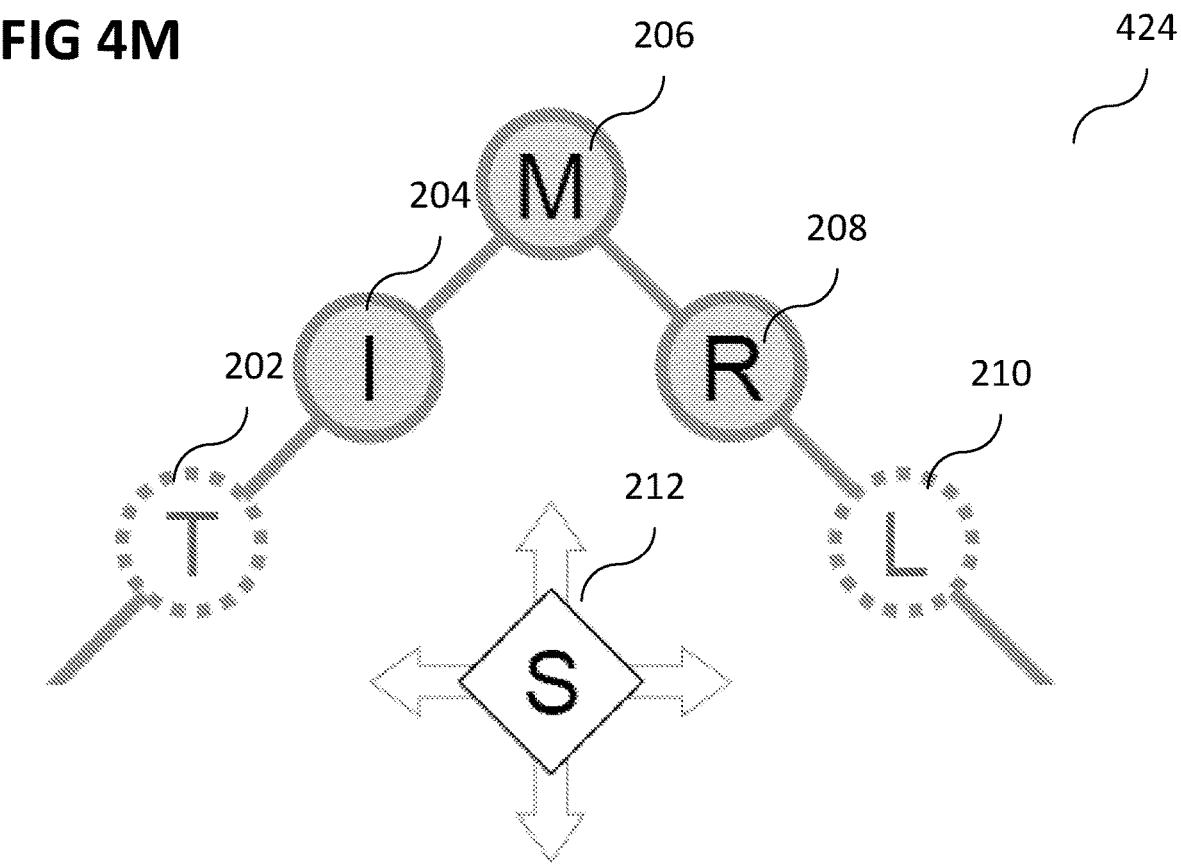
Figure 4N:
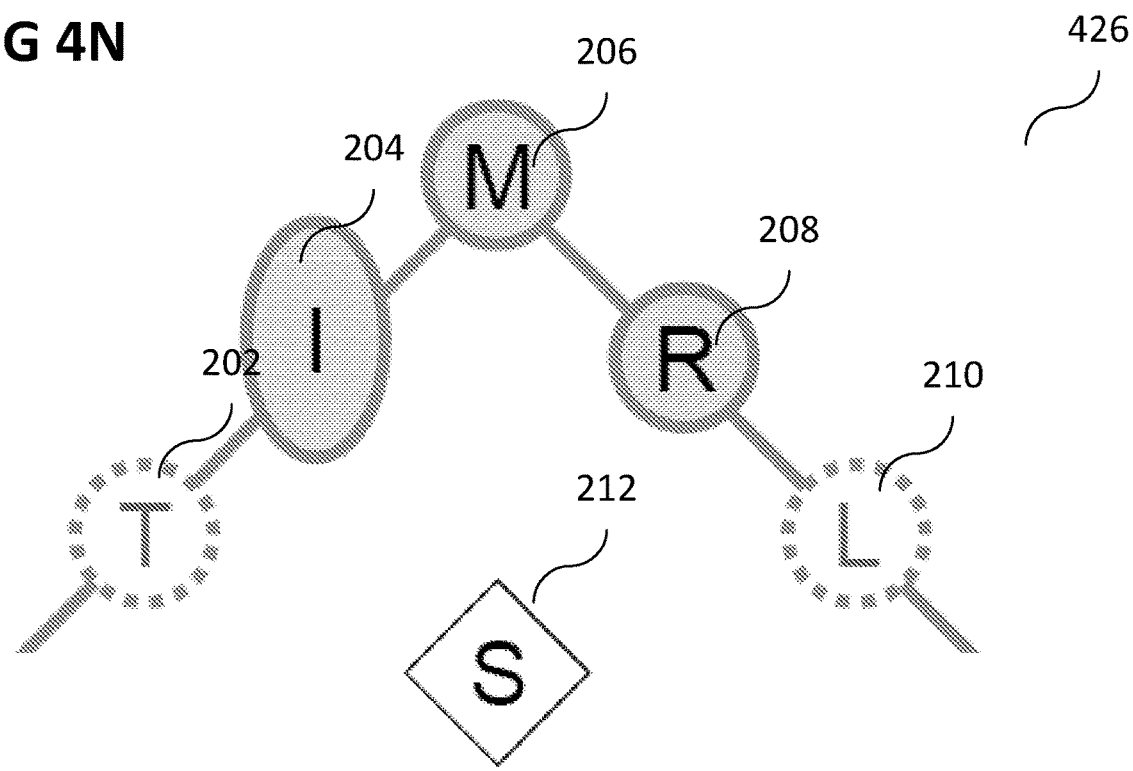

In FIG. 4A to FIG. 4N, various portions may be similar or identical to portions of FIG. 3A, so that duplicate description may be omitted and the same reference signs may be used.

FIG. 4A and FIG. 4B show illustrations 400 and 402 of emulation of left and right mouse buttons. Like illustrated in FIG. 4A, a left mouse button click emulation may be provided. Like illustrated in FIG. 4B, a right mouse button click emulation may be provided.

FIG. 4C, FIG. 4D, FIG. 4E, and FIG. 4F show illustrations 404, 406, 408, and 410 of an emulation of a left-click and drag behavior according to a first method (which may be related to inversion) according to various embodiments.

Like illustrated in FIG. 4C, in a first step of the first method, a user may move his hand to position a cursor over an in-game object to be moved.

Like illustrated in FIG. 4D, in a second step of the first method, the user may lift the index finger to emulate a left-button click. The button may be held as long as the index fixer remains lifted.

Like illustrated in FIG. 4E, in a third step of the first method, the user may move the object to a new location.

Like illustrated in FIG. 4F, in a fourth step of the first method, when the user taps with the index finger, the hold event may be ended and the object may be dropped to the new location.

FIG. 4G, FIG. 4H, FIG. 4I, and FIG. 4J show illustrations 412, 414, 416, and 418 of an emulation of a left-click and drag behavior according to a second method (which may be related to virtual button persistence) according to various embodiments.

Like illustrated in FIG. 4G, in a first step of the second method, a user may move his hand to position a cursor over an in-game object to be moved.

Like illustrated in FIG. 4H, in a second step of the second method, the user may lift and tap with the index finger. The index finger does not need to remain in contact with the trackpad. A "virtual button" may be created below the calculated location of the index finger, which may remain in a down state until pressed again or a specified period of time elapses.

Like illustrated in FIG. 4I, in a third step of the second method, the user may move the object to a new location.

Like illustrated in FIG. 4J, in a fourth step of the second method, the user may lift and tap with the index finger to drop the object at the new location, returning the virtual button to the up state.

FIG. 4K, FIG. 4L, FIG. 4M, and FIG. 4N show illustrations 420, 422, 424, and 426 of an emulation of a left-click and drag behavior according to a third method (which may be related to pressure) according to various embodiments.

Like illustrated in FIG. 4K, in a first step of the third method, a user may move his hand to position a cursor over an in-game object to be moved.

Like illustrated in FIG. 4L, in a second step of the third method, the user may increase and then decrease a pressure of the index finger to emulate a left-click. Continued contact by the index finger may not be required after the mouse down event is triggered.

Like illustrated in FIG. 4M, in a third step of the third method, the user may move the object to a new location.

Like illustrated in FIG. 4N, in a fourth step of the third method, the user may increase and then decrease a pressure of the index finger to drop the object at the new location.

Figure 5A:
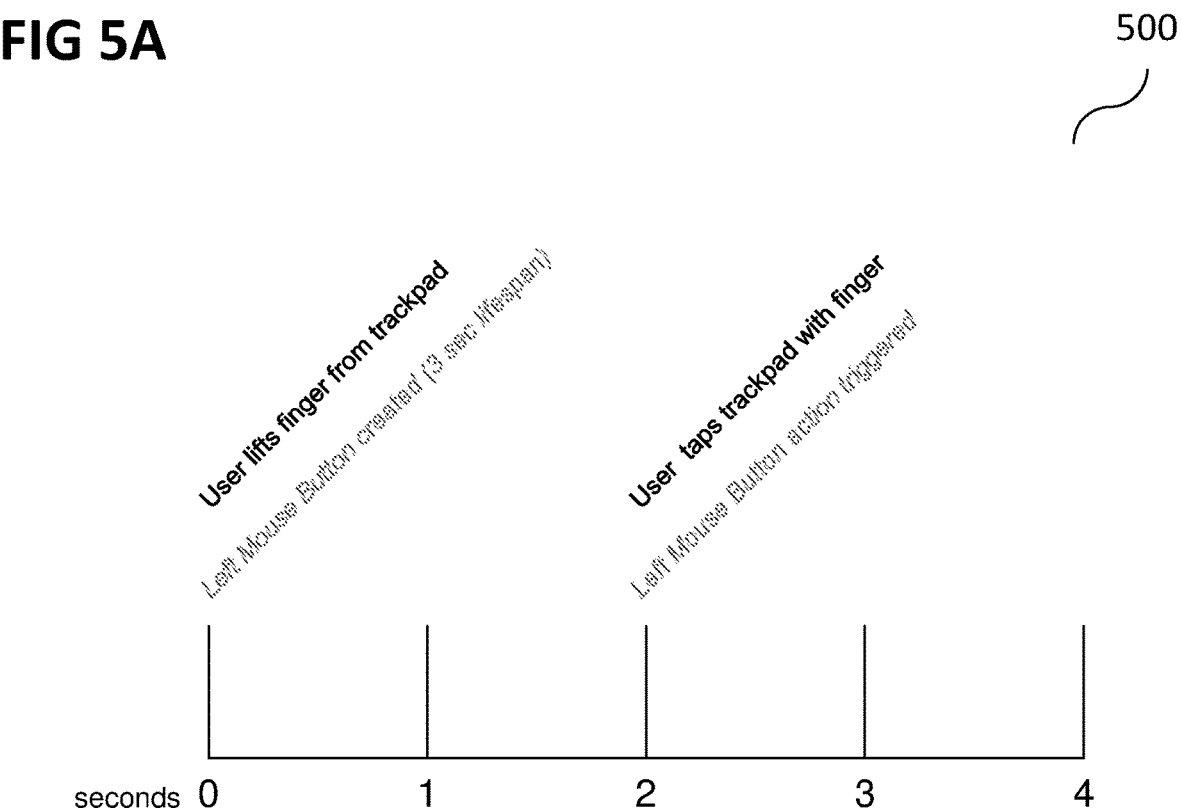
FIG. 5A and FIG. 5B show illustrations and of an example of button persistence according to various embodiments.
Figure 5B:
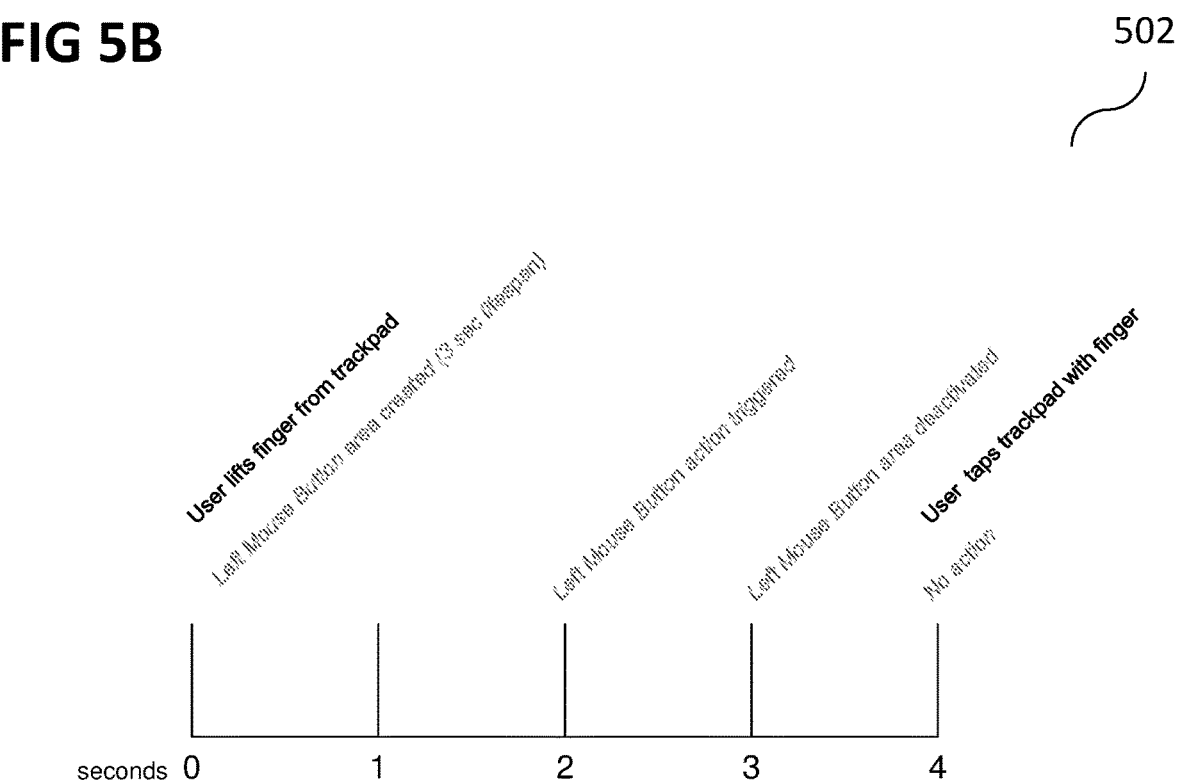

FIG. 5A and FIG. 5B show illustrations 500 and 502 of an example of button persistence according to various embodiments.

According to various embodiments, a pressure/flexion diameter may be provided which may require less engage/dis-engage actions, like will be described in more detail in the following.

According to various embodiments, when a user wants to select an item, he moves the on-screen pointer to the item and increases and decreases the pressure of his index finger on the trackpad. This action may select the item and may map to a left button mouse-down/mouse-up command, which may translate to a left button click for example.

In addition, applying various levels of pressure, whether after a tap or not, may trigger additional or different actions. For example, pressing with a certain amount of force on the top area of the trackpad (measured through the size of the fingertip against the sensor as an example) may trigger a walking action. Applying additional pressure may trigger running, a function often triggered by holding down shift while walking.

According to various embodiments, finger pressure may be used to change or modify events.

Figure 6A:
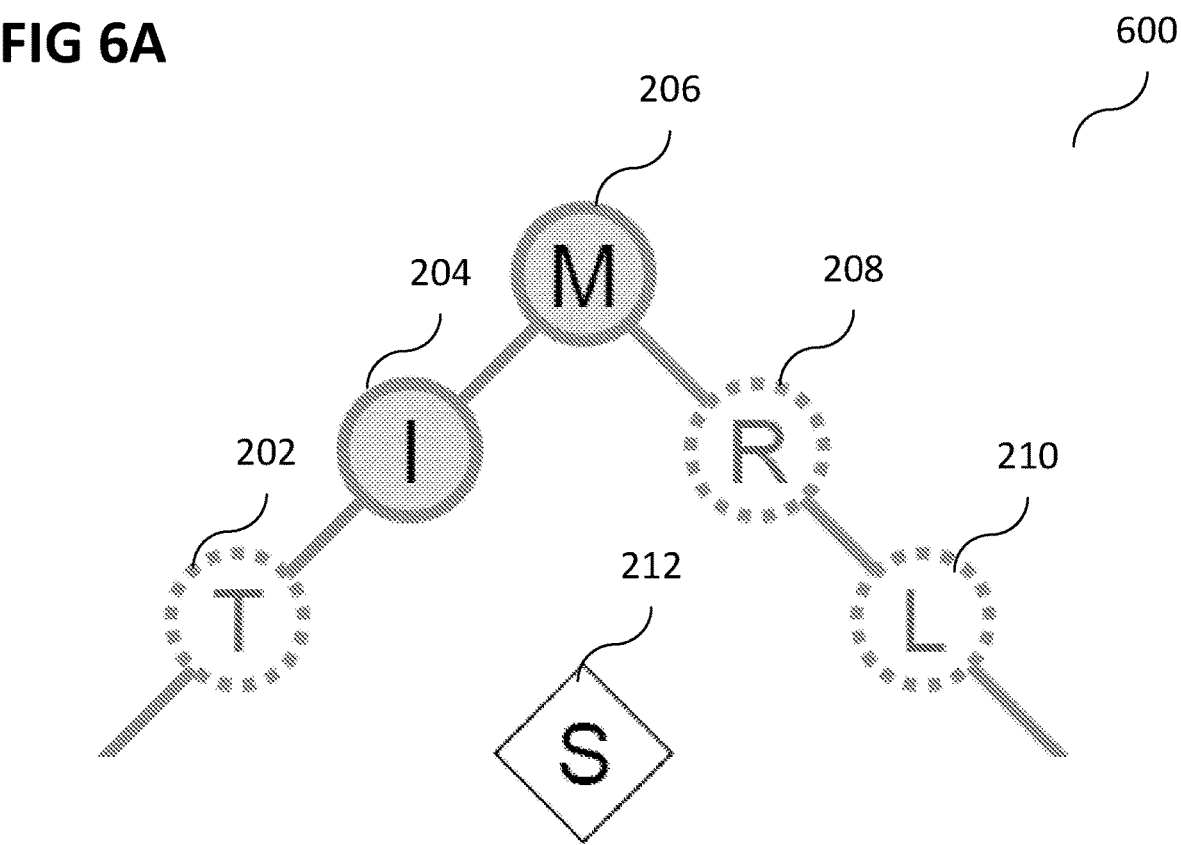
FIG. 6A and FIG. 6B show diagrams illustrating a pressure to control actions according to various embodiments.
Figure 6B:
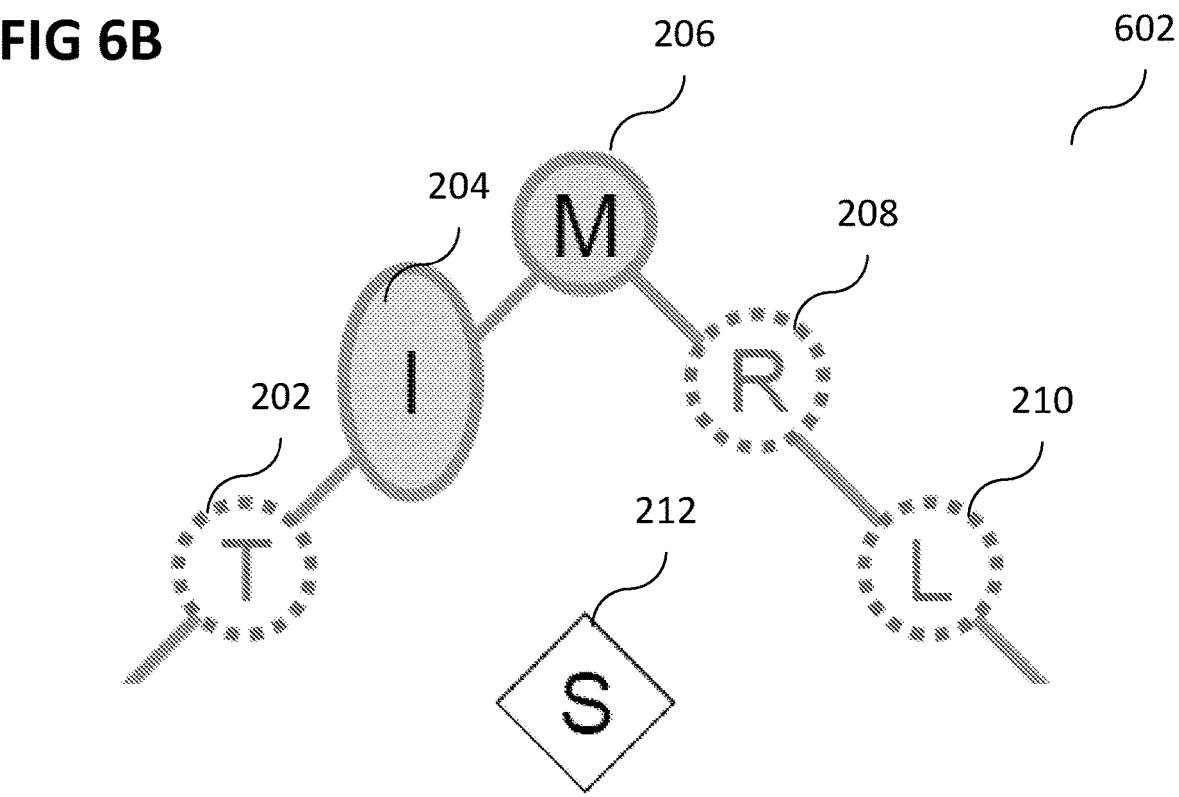

FIG. 6A and FIG. 6B shows diagrams 600 and 602 illustrating a pressure to control actions according to various embodiments. Various portions of FIG. 7 may be similar or identical to portions of FIG. 3A, so that duplicate description may be omitted and the same reference signs may be used.

According to various embodiments, slightly pressing the index finger (like illustrated in FIG. 6A) may initiate a first action (for example a walking action), while more firmly pressing with the index finger (like illustrated in FIG. 6B) may initiate a second action (for example a running action). It will be understood that in FIG. 6B (in line with FIG. 2), an increased area as a result of deflection may indicate an increase in pressure.

According to various embodiments, a scroll wheel behavior may be provided.

According to various embodiments, the scroll wheel behavior may mirror real mouse functionality.

According to various embodiments, lifting and (simultaneously) dragging up or down the index finger may simulate a scroll wheel behavior.

Figure 7A:
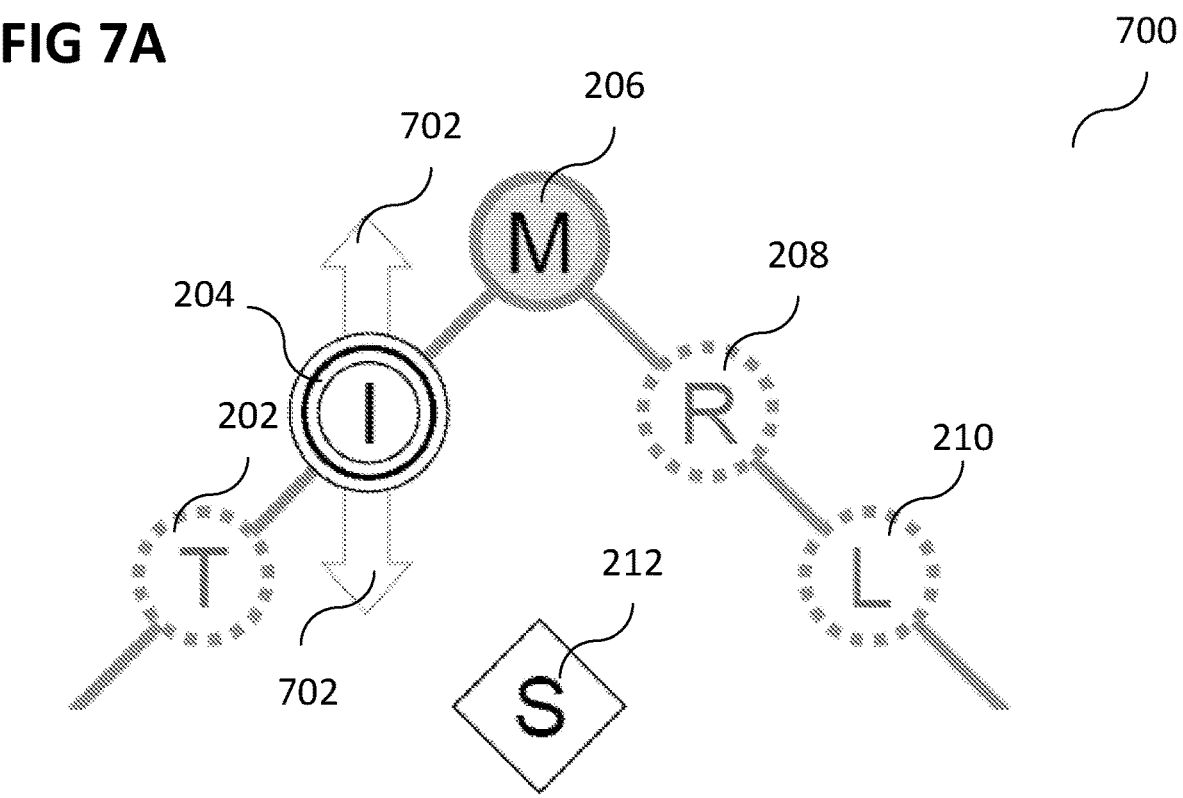
FIG. 7A and FIG. 7B show illustrations of an example of a "scroll wheel" function according to various embodiments.
Figure 7B:
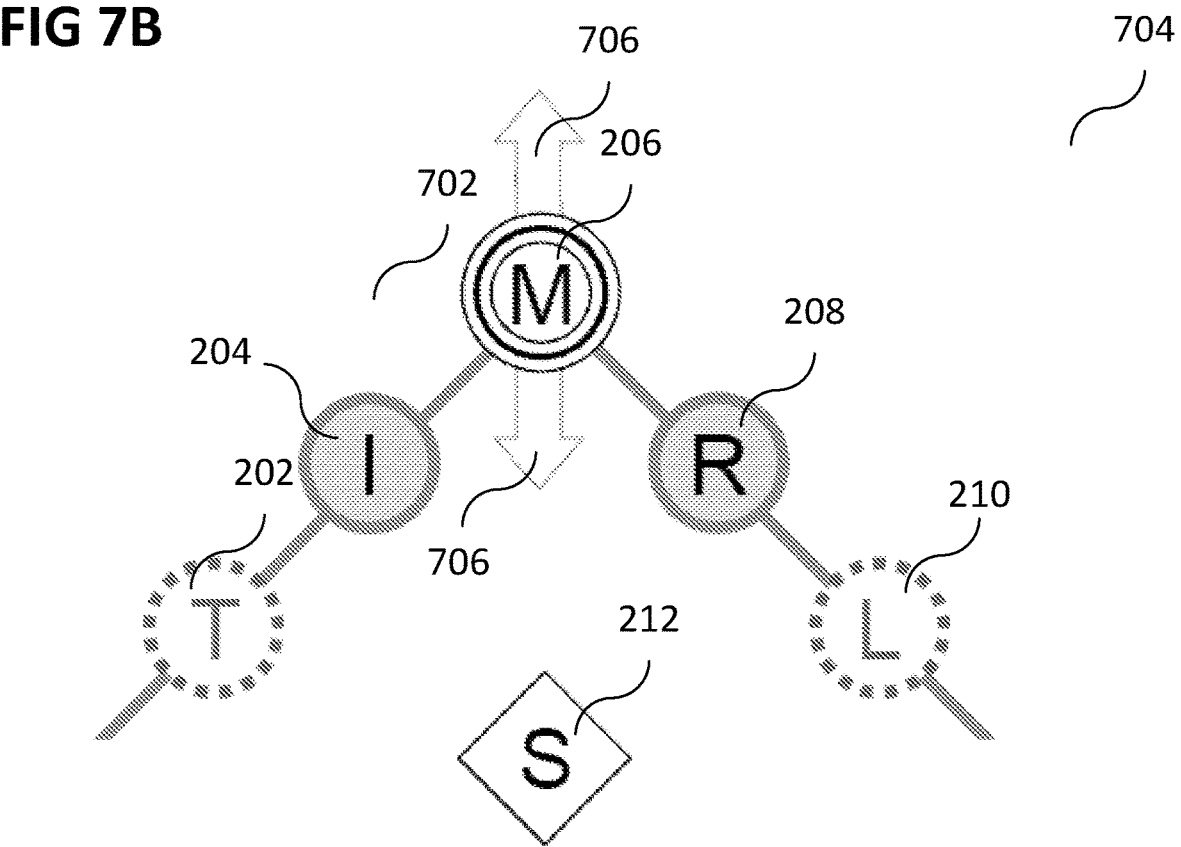

FIG. 7A and FIG. 7B show illustrations 700 and 704 of an example of a "scroll wheel" function according to various embodiments. Various portions of FIG. 7A and FIG. 7B may be similar or identical to portions of FIG. 3A, so that duplicate description may be omitted and the same reference signs may be used. Arrows 702 illustrate the movement of the index finger for the scroll wheel function according to various embodiments. Like illustrated in FIG. 7A, tapping and swiping up or down with the index finger may emulate scroll wheel up/down.

Like illustrated in FIG. 7B, tapping and swiping with the middle finger may trigger scroll wheel up/down. The finger may be identified as middle finger by the presence and location of the two fingers to either side. This may allow other actions to be performed simultaneously by other fingers while scrolling, e.g. tapping with the index finger to fire a weapon or pressing and holding the ring finger to call up a weapon scope.

According to various embodiments, lifting and (subsequent) tapping and holding the middle finger while moving all five fingers may simulate a right mouse button click and drag.

Various embodiments may expand the accessibility of PC gaming by allowing one to play in even more environments and lowering the barrier of entry.

According to various embodiments, instead of a "one-size-fits-all" approach to input design which makes compromises in the name of a single simplified interface, various embodiments account for not only the need for application and use specific modes of trackpad interaction, but also a gaming and 3D object manipulation mode in particular.

According to various embodiments, a computer readable medium may be provided which may include instructions which, when executed by a processor, make the process perform at least one of the methods described above.

While in the above, the various behaviors according to various embodiments have been described with respect to a right hand of the user (i.e. with the thumb as the leftmost finger of the hand), it will be understood that all behaviors may also be performed by a left hand (i.e. with the thumb as the rightmost finger of the hand), for example by mirroring the respective sequence of the fingers on the trackpad.

The following examples pertain to further embodiments.

Example 1 is a trackpad comprising: a sensor configured to sense a position of a plurality of fingers; and a mode determination circuit configured to select in which mode of a plurality of modes to operate the trackpad based on an output of the sensor; wherein the plurality of modes comprises at least two modes of a list of modes consisting of: a cursor mode; a steering mode; and a virtual mouse mode.

In example 2, the subject-matter of example 1 can optionally include that in the cursor mode, at least one finger is used to select an on screen item.

In example 3, the subject-matter of any one of examples 1 to 2 can optionally include that the steering mode comprises at least one of an avatar steering mode or a camera steering mode.

In example 4, the subject-matter of any one of examples 1 to 3 can optionally include that the steering mode is triggered by two fingers on the trackpad.

In example 5, the subject-matter of any one of examples 1 to 4 can optionally include that the virtual mouse mode is triggered by a pre-determined gesture.

In example 6, the subject-matter of any one of examples 1 to 5 can optionally include that the virtual mouse mode provides a virtual mouse around a hand of a user of the trackpad.

In example 7, the subject-matter of example 6 can optionally include that the virtual mouse comprises a sensor and at least one button.

In example 8, the subject-matter of any one of examples 6 to 7 can optionally include that the virtual mouse comprises a at least one scroll wheel.

In example 9, the subject-matter of any one of examples 1 to 8 can optionally include that the mode determination circuit is configured to switch between the modes based on at least one of a button press, a gesture, a touch events, launching an application, and an event within an application.

In example 10, the subject-matter of any one of examples 1 to 9 can optionally include that the mode determination circuit is configured to switch between the modes based on at least one of a current mode and a target mode.

In example 11, the subject-matter of any one of examples 1 to 10 can optionally include that the trackpad is provided in a touchscreen.

Example 12 is a trackpad comprising: a sensor configured to sense a position of a plurality of fingers; a pressure determination circuit configured to determine a pressure of a finger of a user on the trackpad; and an action determination circuit configured to determine whether a user performs a change of pressure of a finger on the trackpad after moving the finger on the trackpad without lifting the finger from the trackpad.

In example 13, the subject-matter of example 12 can optionally include that the change of pressure comprises an increase of pressure.

In example 14, the subject-matter of any one of examples 12 to 13 can optionally include that the change of pressure comprises a decrease of pressure.

In example 15, the subject-matter of any one of examples 12 to 14 can optionally include that the action determination circuit is configured to determine whether an item is selected based on a user moving his finger on the trackpad and then changing the pressure of the finger on the trackpad.

In example 16, the subject-matter of any one of examples 12 to 15 can optionally include that the pressure determination circuit is configured to determine the pressure based on a size of the fingertip on the sensor.

In example 17, the subject-matter of any one of examples 12 to 16 can optionally include that the trackpad is provided in a touchscreen.

Example 18 is a method for controlling a trackpad, the method comprising: sensing a position of a plurality of fingers; and selecting in which mode of a plurality of modes to operate the trackpad based on the sensing; wherein the plurality of modes comprises at least two modes of a list of modes consisting of: a cursor mode; a steering mode; and a virtual mouse mode.

In example 19, the subject-matter of example 18 can optionally include that in the cursor mode, at least one finger is used to select an on screen item.

In example 20, the subject-matter of any one of examples 18 to 19 can optionally include that the steering mode comprises at least one of an avatar steering mode or a camera steering mode.

In example 21, the subject-matter of any one of examples 18 to 20 can optionally include that the steering mode is triggered by two fingers on the trackpad.

In example 22, the subject-matter of any one of examples 18 to 21 can optionally include that the virtual mouse mode is triggered by a pre-determined gesture.

In example 23, the subject-matter of any one of examples 18 to 22 can optionally include that the virtual mouse mode provides a virtual mouse around a hand of a user of the trackpad.

In example 24, the subject-matter of example 23 can optionally include that the virtual mouse comprises a sensor and at least one button.

In example 25, the subject-matter of any one of examples 23 to 24 can optionally include that the virtual mouse comprises a at least one scroll wheel.

In example 26, the subject-matter of any one of examples 18 to 25 can optionally include switching between the modes based on at least one of a button press, a gesture, a touch events, launching an application, and an event within an application.

In example 27, the subject-matter of any one of examples 18 to 26 can optionally include switching between the modes based on at least one of a current mode and a target mode.

Example 28 is a method for controlling a trackpad, the method comprising: sensing a position of a plurality of fingers; determining a pressure of a finger of a user on the trackpad; and determining whether a user performs a change of pressure of a finger on the trackpad after moving the finger on the trackpad without lifting the finger from the trackpad.

In example 29, the subject-matter of example 28 can optionally include that the change of pressure comprises an increase of pressure.

In example 30, the subject-matter of any one of examples 28 to 29 can optionally include that the change of pressure comprises a decrease of pressure.

In example 31, the subject-matter of any one of examples 28 to 30 can optionally include determining whether an item is selected based on a user moving his finger on the trackpad and then changing the pressure of the finger on the trackpad.

In example 32, the subject-matter of any one of examples 28 to 31 can optionally include that the pressure is determined based on a size of the fingertip on the sensor.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A trackpad comprising: a sensor configured to sense a position of a plurality of fingers of a user; and a mode determination circuit configured to switchably select in which mode of a plurality of modes to operate the trackpad based on an output of the sensor; wherein switching between the plurality of modes is enabled by one, or more in combination, of a button press, a gesture, a touch event that may require up to five fingers, a launching an application, and an event within an application; wherein switching is activated or deactivated for each of the plurality of modes; wherein the plurality of modes comprises a steering mode comprising at least one of an avatar steering mode or a camera steering mode; and a virtual mouse mode providing a virtual mouse around a hand of the user, wherein the virtual mouse comprises: at least one button; and a virtual sensor configured to emulate a physical sensor on a mouse input device, wherein a position of the virtual sensor is calibrated based on the position of and distance between the fingers of the user such that an index finger acts as a left mouse button and a middle finger acts as a right mouse button; and wherein the trackpad is configured to, as long as at least one finger of the user remains in contact with the trackpad, maintain the position of the virtual sensor relative to the at least one finger remaining in contact with the trackpad, so that the position of the virtual sensor moves with movement of the at least one finger remaining in contact with the trackpad and an identity of the at least one finger remains known.

2. The trackpad of claim 1, wherein the steering mode is triggered by two fingers on the trackpad.

3. The trackpad of claim 1, wherein the virtual mouse comprises at least one scroll wheel, wherein the at least one scroll wheel is triggered by tapping and swiping with the index finger or the middle finger.

4. The trackpad of claim 1, wherein the mode determination circuit is configured to switch between the camera and virtual mouse modes based on the touch event with all five fingers simultaneously placed on the trackpad.

5. The trackpad of claim 1, wherein the mode determination circuit is configured to switch between the modes based on at least one of a current mode and a target mode.

6. The trackpad of claim 1, wherein the trackpad is provided in a touchscreen.

7. The trackpad of claim 1, wherein the trackpad further comprises:
a pressure determination circuit configured to determine a pressure of a finger of the user on the trackpad; and
an action determination circuit configured to determine whether the user performs a change of pressure of the finger on the trackpad after moving the finger on the trackpad without lifting the finger from the trackpad.

8. The trackpad of claim 7, wherein the pressure determination circuit is configured to determine the pressure based on a size of the fingertip on the sensor.

9. The trackpad of claim 7, wherein the trackpad is provided in a touchscreen.

10. A method for controlling a trackpad, the method comprising: sensing a position of a plurality of fingers of a user; and switchably selecting in which mode of a plurality of modes to operate the trackpad based on the sensing; wherein switching between the plurality of modes is enabled by one, or more in combination, of a button press, a gesture, a touch event that may require up to five fingers, a launching an application, and an event within an application; wherein switching is activated or deactivated for each of the plurality of modes; wherein the plurality of modes comprises a steering mode comprising at least one of an avatar steering mode or a camera steering mode; and a virtual mouse mode providing a virtual mouse around a hand of the user, wherein the virtual mouse comprises: at least one button; and a virtual sensor configured to emulate a physical sensor on a mouse input device, wherein a position of the virtual sensor is calibrated based on the position of and distance between the fingers of the user such that an index finger acts as a left mouse button and a middle finger acts as a right mouse button; and wherein the method further comprises configuring the trackpad to, as long as at least one finger of the user remains in contact with the trackpad, maintain the position of the virtual sensor relative to the at least one finger remaining in contact with the trackpad, so that the position of the virtual sensor moves with movement of the at least one finger remaining in contact with the trackpad and an identity of the at least one finger remains known.

11. The method of claim 10, wherein the steering mode is triggered by two fingers on the trackpad.

12. The method of claim 10, wherein the virtual mouse comprises at least one scroll wheel, wherein the at least one scroll wheel is triggered by tapping and swiping with the index finger or the middle finger.

13. The method of claim 10, further comprising:
switching between the camera and virtual mouse modes is based on the touch event with all five fingers simultaneously placed on the trackpad.

14. The method of claim 10, further comprising:
switching between the modes based on at least one of a current mode and a target mode.

15. The method of claim 10, further comprising:
determining a pressure of a finger of the user on the trackpad; and
determining whether the user performs a change of pressure of the finger on the trackpad after moving the finger on the trackpad without lifting the finger from the trackpad.

16. The trackpad of claim 1, wherein the trackpad is further configured to emulate a click of the left mouse button in response to the index finger being lifted, wherein the left mouse button is held as long as the index finger remains lifted.

17. The trackpad of claim 1, wherein the trackpad is further configured to emulate a click of the left mouse button in response to the index finger tapping the trackpad, wherein the trackpad is further configured to create a virtual button after the index finger taps the trackpad, and maintain the virtual button in a down state until the index finger taps the trackpad again or until a specified period of time elapses.

18. The trackpad of claim 17, wherein the trackpad is further configured to maintain the virtual button in the down state regardless of whether the index finger remains in contact with the trackpad after the index finger taps the trackpad.

* * * * *